(12) United States Patent
Hong

(10) Patent No.: US 10,447,940 B2
(45) Date of Patent: Oct. 15, 2019

(54) PHOTOGRAPHING APPARATUS USING MULTIPLE EXPOSURE SENSOR AND PHOTOGRAPHING METHOD THEREOF

(71) Applicant: SAMSUNG ELECTRONICS CO., LTD., Suwon-si, Gyeonggi-do (KR)

(72) Inventor: Hyun-seok Hong, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 197 days.

(21) Appl. No.: 15/070,192

(22) Filed: Mar. 15, 2016

(65) Prior Publication Data

US 2017/0126947 A1 May 4, 2017

(30) Foreign Application Priority Data

Oct. 30, 2015 (KR) ........................ 10-2015-0152253

(51) Int. Cl.
*H04N 5/228* (2006.01)
*H04N 5/235* (2006.01)
(Continued)

(52) U.S. Cl.
CPC ......... *H04N 5/2353* (2013.01); *H04N 5/2356* (2013.01); *H04N 5/23293* (2013.01);
(Continued)

(58) Field of Classification Search
CPC ........... H04N 1/00684; H04N 5/23299; H04N 5/144; H04N 5/23251; H04N 5/2327;
(Continued)

(56) References Cited

U.S. PATENT DOCUMENTS 6,943,837 B1 * 9/2005 Booth, Jr. ............ H04N 5/3537
348/223.1
7,825,969 B2 11/2010 Tico et al.
(Continued)

FOREIGN PATENT DOCUMENTS

JP 2008-219320 9/2008
JP 4544332 9/2010
(Continued)

OTHER PUBLICATIONS

Bluemies, "Pop Cam: Instant Andy Warhol Art," internet web page at https://www.lomography.com/magazine/74710-pop-cam-instant-andy-warhol-art, dated Jun. 8, 2011 (Year: 2011).*
(Continued)

*Primary Examiner* — Sinh Tran
*Assistant Examiner* — Selam T Gebriel
(74) *Attorney, Agent, or Firm* — Nixon & Vanderhye, P.C.

(57) ABSTRACT

A photographing apparatus using a multiple exposure image sensor, and a photographing method thereof are provided. The photographing apparatus includes: an image sensor formed of a plurality of pixels comprising a plurality of colors; input circuitry configured to receive an input of a photographing command; and a processor configured to, in response to a photographing command being input while a photographing mode of the photographing apparatus is a multiple exposure mode, acquire a multiple exposure image by controlling exposure times of a plurality of pixel groups in which the plurality of pixels are grouped by color.

16 Claims, 25 Drawing Sheets

(51) Int. Cl.
*H04N 9/04* (2006.01)
*H04N 5/232* (2006.01)
*H04N 5/262* (2006.01)
*H04N 5/353* (2011.01)

(52) U.S. Cl.
CPC ......... *H04N 5/2621* (2013.01); *H04N 5/2625* (2013.01); *H04N 5/3537* (2013.01); *H04N 9/045* (2013.01)

(58) Field of Classification Search
CPC .. H04N 5/2329; H04N 5/2627; H04N 5/2353; H04N 5/2356; H04N 5/3535; H04N 5/35581; H04N 9/0455; H04N 9/04551; H04N 9/3114; H04N 9/3117; H04N 5/22525; H04N 5/23293; H04N 5/232945; H04N 5/232941; H04N 5/232939; H04N 5/232935; H04N 5/232933; H04N 5/235–5/243; G08B 13/196; G06T 13/80; G03B 7/00–7/28; G03B 9/58–9/62; G03B 2207/00–2207/005
See application file for complete search history.

(56) References Cited

U.S. PATENT DOCUMENTS

| | | | |
|---|---|---|---|
| 8,184,188 B2 | 5/2012 | Yaghmai | |
| 8,848,097 B2 | 9/2014 | Makii | |
| 9,451,173 B2 | 9/2016 | Kang et al. | |
| 2004/0212692 A1* | 10/2004 | Nakami | H04N 1/409 348/224.1 |
| 2006/0007341 A1* | 1/2006 | Nakamura | H04N 5/23212 348/333.05 |
| 2006/0146189 A1 | 7/2006 | Riemens et al. | |
| 2006/0192867 A1 | 8/2006 | Yosefin | |
| 2009/0091645 A1 | 4/2009 | Trimeche et al. | |
| 2010/0271515 A1* | 10/2010 | Imagawa | H04N 5/144 348/266 |
| 2011/0050722 A1 | 3/2011 | Muraki et al. | |
| 2011/0063460 A1 | 3/2011 | Tokui | |
| 2011/0149129 A1 | 6/2011 | Kim et al. | |
| 2012/0242851 A1 | 9/2012 | Fintel et al. | |
| 2012/0243802 A1* | 9/2012 | Fintel | H04N 5/2625 382/284 |
| 2013/0027596 A1 | 1/2013 | Wan | |
| 2013/0033616 A1 | 2/2013 | Kaizu et al. | |
| 2013/0286450 A1 | 10/2013 | Ma | |
| 2014/0002696 A1* | 1/2014 | Mori | H04N 5/2621 348/239 |
| 2015/0030204 A1 | 1/2015 | Lee et al. | |
| 2015/0229850 A1 | 8/2015 | Lee et al. | |
| 2015/0244916 A1 | 8/2015 | Kang et al. | |
| 2015/0312504 A1* | 10/2015 | Aldridge | H04N 5/3743 348/157 |

FOREIGN PATENT DOCUMENTS

| | | |
|---|---|---|
| JP | 2011-244027 | 12/2011 |
| JP | 5098949 | 12/2012 |
| KR | 10-2011-0062981 | 6/2011 |
| KR | 10-2015-0099302 | 8/2015 |
| WO | 2007/017835 | 2/2007 |

OTHER PUBLICATIONS

Search Report and Written Opinion dated Sep. 1, 2016 in counterpart International Patent Application No. PCT/KR2016/002708.
Extended European Search Report dated Apr. 19, 2018 in European Patent Application No. 16860036.9.
Examination Report dated Nov. 30, 2018 in European Patent Application No. 16860036.9.

* cited by examiner

|   | 1 | 2 | 3 | 4 |
|---|---|---|---|---|
| 1 | B | G |   |   |
| 2 | G | R |   |   |
| 3 |   |   |   |   |
| 4 |   |   |   |   |

PHOTOGRAPHING APPARATUS USING MULTIPLE EXPOSURE SENSOR AND PHOTOGRAPHING METHOD THEREOF

CROSS-REFERENCE TO RELATED APPLICATION

This application is based on and claims priority under 35 U.S.C. § 119 to Korean Patent Application No. 10-2015-0152253, filed on Oct. 30, 2015, in the Korean Intellectual Property Office, the disclosure of which is incorporated by reference herein in its entirety.

BACKGROUND

Field

The present disclosure relates generally to a photographing apparatus for photographing an image through a multiple exposure image sensor and a photographing method thereof. For example, the present disclosure relates to a photographing apparatus which can generate an image effect by adjusting light accumulation through exposure on/off of an image sensor, and a photographing method thereof.

Description of Related Art

An image sensor which generates an image by electrically converting light entering through a lens in a photographing apparatus may be divided into a Charge-Coupled Device (CCD) and a Complementary Metal Oxide Semiconductor (CMOS).

The CCD and the CMOS maintain an appropriate exposure by means of a shutter which adjusts an amount of light by starting or ending an exposure. The shutter for adjusting the amount of light as described above is divided into a rolling shutter and a global shutter according to how it is operated.

The rolling shutter method does not provide a storage for storing an electric charge of a photo diode for each pixel in the image sensor, and thus starts and ends an exposure in each pixel in sequence. The global shutter method starts an exposure in the entire pixels of the image sensor simultaneously, and ends the exposure in the entire pixels simultaneously using a storage provided for each pixel after appropriate exposure time.

The photographing apparatus in the global shutter method may set a plurality of pixel areas to have different exposure times with respect to an image to be photographed. That is, the photographing apparatus may set a long exposure to be performed in at least one of the plurality of pixel areas with respect to the image to be photographed, and may set a short exposure to be performed in the other pixel areas. In this case, the photographing apparatus may acquire an image having a High Dynamic Range (HDR) by correcting the photographed image.

The related-art photographing apparatus in the global shutter method may distinguish between light accumulation pixels and storing pixels for all of the pixels during an aperture opening time in exposure of an image sensor. In this case, the image sensor exposes light at some divided times rather than the entire exposure time. Accordingly, the image sensor can solve a motion blur problem which is generated when photographing a motion of an object in a multiple exposure photographing mode, so that a sharp motion can be distinguished in one image.

However, the related-art method has a problem that it is difficult to know a temporal sequence of occurrence of segmented motions of a moving object since the photographing apparatus controls to turn on/off the exposure of the entire pixels at the divided times in the image sensor during the aperture opening time.

SUMMARY

Example embodiments of the present disclosure address the above disadvantages and other disadvantages not described above.

The present disclosure provides a photographing apparatus which controls exposure on/off of pixels in an image sensor according to a pixel group during an aperture opening time, and distinguishes segmented motions of a moving object in different color or brightness, so that a temporal sequence of occurrence of the segmented motions can be determined, and a photographing method thereof.

According to an example aspect of the present disclosure, a photographing apparatus which photographs an image through a multiple exposure sensor includes: an image sensor comprising a plurality of pixels including a plurality of colors; input circuitry configured to receive an input of a photographing command; and a processor configured to, in response to a photographing command being input through the input circuitry while a photographing mode of the photographing apparatus is a multiple exposure mode, acquire a multiple exposure image by controlling exposure times of a plurality of pixel groups in which the plurality of pixels are grouped by color.

While the image sensor is photographing an image, the processor may be configured to photograph a plurality of motions included in the image in different color or brightness by controlling the exposure times of the plurality of pixel groups.

While the image is being photographed, the processor may be configured to control the exposure times of the plurality of pixel groups by controlling at least one of exposure on/off states of the plurality of pixel groups or an exposure on/off state having a duty ratio which is an exposure on/off frequency.

The processor may be configured to acquire a first motion having a first color by turning on at least one of the plurality of pixel groups in a first portion of a time during which the image is photographed, and to acquire a second motion having a second color by turning on at least another one of the plurality of pixels in a second portion of the time during which the image is photographed.

The processor may be configured to acquire a first motion having a first brightness value corresponding to a first time by turning on all of the plurality of pixel groups during the first time in a first portion of the time during which the image is photographed, and to acquire a second motion having a second brightness value by turning on all of the plurality of pixel groups during a second time in a second portion of the time during which the image is photographed.

The photographing apparatus may further include a storage, and, in response to receiving a command to set color or brightness of a plurality of motions included in an image, the processor may be configured to determine the exposure times of the plurality of pixel groups based on the command, and store the determined exposure times in the storage.

The processor may be configured to analyze a live view image and to determine a movement of an object included in the image based on a designated speed, and to estimate a movement of the object based on the determined movement and to control the exposure times of the plurality of pixel groups.

In response to the object being determined to have much (e.g., greater than a threshold amount) or fast (e.g., faster than a threshold speed) movements, the processor may be configured to control the exposure times of the plurality of pixel groups to increase the number of motions of the object included in the image.

The processor may be configured to control the exposure times of the plurality of pixel groups in which the plurality of pixels are grouped by areas, wherein the areas may be distinguished by sizes of the plurality of pixels where motions of different objects included in the image are made.

The processor may be configured to control the color or brightness of the plurality of motions to be determined based on a color profile before photographing, and to detect main background color on the live view in advance and to automatically set the color or brightness of the plurality of motions.

According to another example aspect of the present disclosure, a method of using a photographing apparatus includes: capturing an image through an image sensor formed of a plurality of pixels including a plurality of colors; receiving an input of a photographing command; in response to a photographing command being input through the inputting step while a photographing mode of the photographing apparatus is a multiple exposure mode, controlling exposure times of a plurality of pixel groups in which the plurality of pixels are grouped by color; and, acquiring a multiple exposure image.

The controlling may include, while an image is being photographed, photographing, by the image sensor, a plurality of motions included in the image in different color or brightness by controlling the exposure times of the plurality of pixel groups.

The controlling may include, while the image is being photographed, controlling the exposure times of the plurality of pixel groups by controlling at least one of exposure on/off states of the plurality of pixel groups or an exposure on/off state having a duty ratio which is an exposure on/off frequency.

The acquiring may include acquiring a first motion having a first color by turning on at least one of the plurality of pixel groups in a first portion of a time during which the image is photographed, and acquiring a second motion having a second color by turning on at least another one of the plurality of pixels in a second portion of the time during which the image is photographed.

The controlling may further include, in response to receiving a command to set color or brightness of a plurality of motions included in an image, determining the exposure times of the plurality of pixel groups based on the command, and the method may further include storing the determined exposure times.

The acquiring may include acquiring a first motion having a first brightness value corresponding to a first time by turning on all of the plurality of pixel groups during the first time in a first portion of the time during which the image is photographed, and acquiring a second motion having a second brightness value by turning on all of the plurality of pixel groups during a second time in a second portion of the time during which the image is photographed.

The controlling may include analyzing a live view image and determining a movement of an object included in the image based on a designated speed, and estimating a movement of the object based on the determined movement and controlling the exposure times of the plurality of pixel groups.

The controlling may include, in response to the object being determined to have much (e.g., greater than a threshold amount) or fast (e.g., faster than a threshold speed) movements, controlling the exposure times of the plurality of pixel groups to increase the number of motions of the object included in the image.

The controlling may include controlling the exposure times of the plurality of pixel groups in which the plurality of pixels are grouped by areas, wherein the areas are distinguished by sizes of the plurality of pixels where motions of different objects included in the image are made.

The controlling may include controlling the color or brightness of the plurality of motions to be determined by a user based on a color profile before photographing, and detecting main background color on the live view in advance and automatically setting the color or brightness of the plurality of motions.

According to the apparatus and method of the example embodiments described above, images of motions photographed in the photographing apparatus of the multiple exposure image sensor can show the temporal sequence of occurrence of the segmented motions by means of color or brightness applied to the segmented motions.

Additional and/or other aspects and advantages of the disclosure will be set forth in part in the detailed description which follows and, in part, will be apparent from the description.

BRIEF DESCRIPTION OF THE DRAWINGS

The above and/or other aspects of the present disclosure will be more apparent from the following detailed description, taken in conjunction with the accompanying drawings, in which like reference numerals refer to like elements, and wherein:

FIG. 3 is a diagram illustrating example sensor pixels having an RGGB Bayer pattern as an example indicating a plurality of pixel areas of an image sensor;

DETAILED DESCRIPTION

Figure 1:
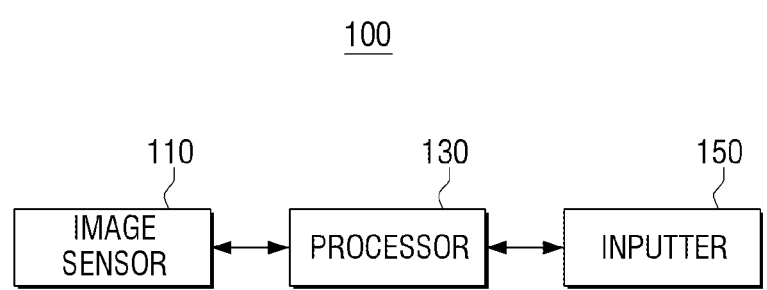
FIG. 1 is a block diagram illustrating an example configuration of a photographing apparatus.

The technical terms used in describing the various example embodiments of the present disclosure are simply used for the purpose of describing particular example embodiments and are not intended to limit the present disclosure. In addition, the technical terms used in example embodiments should be interpreted as having the same meanings as generally understood by an ordinary skilled person in the related art unless they are defined otherwise, and should not be interpreted as having excessively broad meanings or excessively narrow meanings. In addition, if the technical terms used in example embodiments are technical terms which do not exactly represent the idea of the present disclosure, they should be substituted with technical terms which can be correctly understood by an ordinary skilled person in the related art, and should be understood. In addition, the general terms used in this disclosure should be interpreted as defined in a dictionary or within the context, and should not be interpreted as having excessively narrow meanings.

In addition, the singular forms used in example embodiments are intended to include the plural forms as well, unless the context clearly indicates otherwise. In addition, the term "comprise" or "include" used in example embodiments of the present disclosure should not be interpreted as necessarily including all of the elements or steps described in the specification, and should be interpreted as not including some of the elements or some of the steps or as further including additional elements or steps.

In addition, the term "unit" used in relation to the elements described in the disclosure may be used only for easy preparation of the disclosure, or interchangeably used with other terms, and does not have its own distinct meaning or role.

The terms such as "first" and "second" used in various example embodiments may be used to explain various elements, and does not limit the corresponding elements. These terms may be used for the purpose of distinguishing one element from another element. For example, a first element may be named a second element without departing from the scope of right of various example embodiments of the present disclosure, and similarly, a second element may be named a first element.

Example embodiments of the present disclosure will be described below with reference to the accompanying drawings. In the explanation of the drawings, the same reference numerals are used for the same or similar elements regardless of signs in the drawings, and a redundant explanation regarding these may be omitted.

In addition, in the following description, detailed descriptions of well-known functions or configurations may be omitted since they may unnecessarily obscure the subject matters of the present disclosure. In addition, it should be noted that the drawings as attached are provided simply for ease of understanding of the present disclosure, and should not be interpreted as limiting the present disclosure.

Hereinafter, example embodiments of the present disclosure will be explained in greater detail with reference to the accompanying drawings. FIG. 1 is a block diagram schematically illustrating an example configuration of a photographing apparatus. As illustrated in FIG. 1, the photographing apparatus 100 includes an image sensor 110, a processor (e.g., including processing circuitry) 130, and an inputter (e.g., including input circuitry/hardware) 150.

The photographing apparatus 100 may, for example, be a digital camera, a wireless communication device, a mobile phone, a camera phone mobile device, a portable photographing apparatus, a smart phone, a tablet PC, etc. However, the above-described example is merely an example embodiment for the present disclosure, and this should not be considered as limiting.

The image sensor 110 may be formed of a plurality of pixels including a plurality of colors, and may convert an exposure entering through a lens (not shown) into an electric signal, and accumulates and stores converted electric charges in a plurality of pixel areas. For example, the plurality of pixels may be RGB pixels and RGB Bayer pattern. However, this is merely an example embodiment provided to explain the present disclosure, and the image sensor 110 may comprise various pixels. For example, the image sensor 110 may be implemented using a sensor having a Bayer pattern such as RGGB, RGBW, RGB-IR, CYYM, CMYK, etc., or a sensor which can collect various colors in each of the pixels.

According to an example embodiment of the present disclosure, the image sensor 110 may adopt a global shutter method and may be a Charge-Coupled Device (CCD) or Complementary Metal Oxide Semiconductor Image Sensor (CIS), or the like. For example, the CIS includes a photo diode which serves as a light receiver in each of the plurality of pixels, and a storage diode which stores the electric charges accumulated in the light receiver.

The inputter 150 receives an input of a photographing command, for example, from a user. The inputter 150 may receive an input of a user command such as a photographing command or a multiple exposure setting command for each pixel group from the user. The inputter 150 may, for example, be a touch screen, a mouse, a stylus pen, a button, a wheel, etc. However, this is merely an example embodiment provided to explain the present disclosure, and this should not be considered as limiting.

The photographing apparatus 100 may further include a storage (not shown). The storage may store an image which is acquired under control of the processor 130.

The storage may store information on pixel groups which include the plurality of pixels of the image sensor 110 classified by color filters of each color or color filters of each area. The storage may store information for estimating a designated capturing moment of a subject based on a motion trajectory or a motion speed of the subject.

In response to a photographing mode of the photographing apparatus 100 being a multiple exposure mode, and the user's photographing command being input through the inputter 150, the processor 130 may be configured to control the exposure time of the pixel groups which include the plurality of pixels of the image sensor 110 classified by color filters which are applied to the pixels based on colors or areas. In this example, the processor 130 may be configured to control an on/off state of an exposure by, for example, controlling a switch connecting the photo diode and the storage diode of the image sensor 110.

The processor 130 may be configured to control the exposure time of the plurality of pixel groups while photographing an image in the multiple exposure mode through the image sensor 110, and to control color or brightness differently to distinguish a plurality of motions included in the photographed image. For example, in the case of a long exposure having a long exposure time, the processor 130 may be configured to acquire a brighter image as the intensity of the image increases. On the other hand, in the case of a short exposure having a shorter exposure time, the processor 130 may be configured to acquire an image darker than the long-exposure image as the intensity of the image decreases.

The expressions "while an image is photographed" and "a time at which an image is photographed" used in example embodiments of the present disclosure may be the same as or similar to expressions "while an aperture is opened" and "an aperture opening time." In addition, the intensity of the image may be the same or similar to an expression as brightness of the image.

In addition, the processor 130 may be configured to control the on/off state of the exposure of the image sensor 110 based on information stored in the storage (not shown). The processor 130 may be configured to control a display (not shown) to display a temporal sequence of color or brightness applied to the acquired image and the motion included in the image based on the exposure time information which is acquired through the image sensor 110. In addition, the display of the temporal sequence of color or brightness may be overlaid on the image and stored or stored as a separate file.

Figure 2:
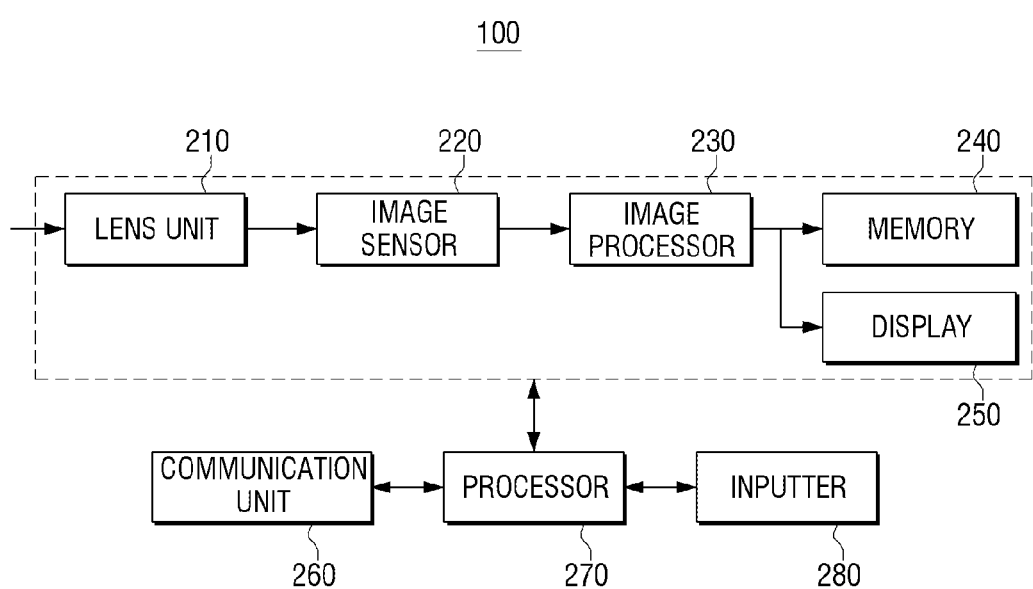
FIG. 2 is a block diagram illustrating an example configuration of a photographing apparatus.

FIG. 2 is a block diagram illustrating an example configuration of the photographing apparatus 100 in greater detail. Referring to FIG. 2, the photographing apparatus 100 includes a lens unit (e.g., including a lens and circuitry) 210 for generating and processing an image, an image sensor 220, an image processor (e.g., including processing circuitry) 230, a memory 240, and a display (e.g., including a display panel and driving circuitry) 250. In addition, the photographing apparatus 100 may further include a communication unit (e.g., including communication circuitry) 260, a processor (e.g., including processing circuitry) 270, and an inputter (e.g., including input circuitry/hardware) 280.

The lens unit 210 includes, for example, a lens, a color filter, an aperture, etc. The image sensor 220 may be a Complementary Metal Oxide Semiconductor (CMOS) or a Charge-Coupled Device (CCD), or the like. The image sensor 220 generates an analogue electrical signal based on an amount of light entering through the lens unit 210. The analogue signal generated in the image sensor 220 is supplied to the image processor 230, and the image processor 230 may process the signal supplied from the image sensor 220, thereby generating an image. The image generated in the image processor 230 is stored in the memory 240 and displayed on the photographing apparatus 100 through the display 250.

According to an example embodiment, the image sensor 220 includes a plurality of pixels. The plurality of pixels may be grouped into pixel groups by color filters which are applied to the pixels based on area or color. In this example, at least one of the pixel groups may initiate a time division multiple exposure under control of the processor 270.

The memory 240 may temporarily store data which is generated by the processor 270. In addition, the memory 240 may temporarily store an image which is captured by the image sensor 220. The memory 240 may store a program, an operation parameter, a user command, etc. which are used in the processor 270. The memory 240 may, for example, be at least one of storage media such as a hard disk, a multimedia card, a flash memory, a micro, an SD card, an XD card, etc. In addition, the memory 240 may be a Random Access Memory (RAM) or a Read Only Memory (ROM) in the processor 270, or the like.

The display 250 may display image data which is processed in the image processor 230, an image which is stored in the memory 240, an image which is stored in an external storage device, and an image which is input through an external input interface, based on a control command of the processor 270. In addition, the display 250 may display a menu screen, and may display a temporal sequence of images based on color or brightness of an image which is acquired in a multiple exposure photographing mode. In addition, the display 250 may display a moving image or a live view as well as an image. In addition, the display 250 may display a pop-up menu while displaying the live view.

The display 250 may be implemented in various forms such as, for example, a Liquid Crystal Display (LCD), an Organic Light Emitting Diode (OLED), a flexible display, a 3D display, etc. The display 250 may be implemented using a touch screen and thus may be used as an input device to receive a user's command as well an output device.

The communication unit 260 may be configured to perform wired/wireless data communication with an external terminal device. When the communication unit 260 performs data communication with an external terminal device in a wireless communication method, the communication unit 260 may include, for example, at least one of a WiFi Direct communication module, a Bluetooth module, an Infrared Data Association (IrDA) module, a Near Field Communication (NFC) module, a Zigbee module, a cellular communication module, a 3G ($3^{rd}$ generation) mobile communication module, 4G mobile communication module, and a Long Term Evolution (LTE) communication module, or the like.

When the communication unit 260 performs data communication with an external terminal device in a wired communication method, the communication unit 260 may include, for example, an interface module (e.g., including interface circuitry) such as a Universal Serial Bus (USB), and may be physically connected with the external terminal device such as a PC through the interface module to exchange image data or exchange firmware data for upgrading firmware.

The inputter 280 may receive an input command and may include, for example, a button (not shown) or a wheel (not shown). In addition, the inputter 280 may include, for example, a touch panel (not shown) located on the display 250. Accordingly, the inputter 280 may receive an input command such as a photographing command or an editing command for a photographed image from the user. According to an example embodiment, the inputter 280 may receive the multiple exposure photographing mode, and receive setting on color or brightness for each of the pixel groups of the multiple exposure photographing mode.

The processor 270 may be configured to control an on/off state of an exposure of the plurality of pixel groups of the image sensor 220 based on area or color (brightness). In addition, the processor 270 may be configured to control the exposure time for each of the pixel groups of the image sensor 220 based on a command input through the inputter 280.

The processor 270 may be configured to control the exposure time of the plurality of pixel groups by controlling at least one of an exposure on/off state of the plurality of pixel groups or an exposure on/off state having a duty ratio indicating a ratio of an exposure on state to an exposure off state while an aperture is opened.

In this example, the processor 270 may be configured to acquire an image of a first motion having a first color by turning on an exposure of at least one of the plurality of pixel groups in a first section at the time during which the image is photographed, and may acquire an image of a second motion having a second color by turning on an exposure of at least another one of the plurality of pixel groups in a second section at the time during which the image is photographed.

In addition, the processor 270 may be configured to acquire the image of the first motion having a first brightness value corresponding to a first time by turning on the exposure of all of the plurality of pixel groups during the first time in the first section at the time during which the image is photographed, and may acquire the image of the second motion having a second brightness value by turning on the exposure of all of the plurality of pixel groups during a second time in the second section at the time during which the aperture is opened.

In response to receiving a command (e.g., a user command) to set color or brightness on a plurality of motions included in the image being input through the inputter 150, the processor 270 may be configured to determine the exposure time of the plurality of pixel groups based on the input user command, and store the determined exposure time in the storage (e.g., memory 240).

In addition, the processor 270 may be configured to analyze the live view and determine a movement of an object included in the image based on a designated speed which is stored in the storage (e.g., memory 240). In this example, the designated speed which is stored in the storage may be information for estimating and determining a movement of a subject. The processor 270 may be configured to estimate the movement of the object based on the determined movement and to control the exposure time of the plurality of pixel groups.

In this example, in response to the object being determined to have much (e.g., greater than a threshold amount) or fast (e.g., faster than a threshold speed) movement, the processor 270 may be configured to control the exposure time of the plurality of pixel groups such that the number of movements of the object included in the image increases.

Figure 3:
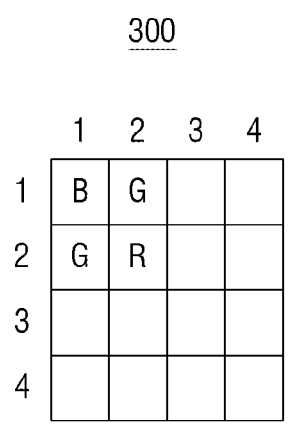

FIG. 3 is a diagram illustrating an example 4×4 RGB array indicating a plurality of pixel areas forming the image sensor. Referring to FIG. 3, according to an example embodiment, each of the pixel groups formed of the plurality of pixels in the RGB array 300 may be formed of single color filters of red (R), green (G), and blue (B). In addition, each of the pixel groups may be implemented by using a color filter in which color filters of R, G, and B are mixed.

For example, the photographing apparatus 100 may generate various color profiles by controlling an exposure on/off state of each of the RGB pixel groups of the image sensor and the frequency of exposure on/off states. In response to the exposure time of the image sensor being a long exposure in the R pixel group and the exposure being off in the G and B pixel groups, the photographing apparatus 100 may be configured to acquire a red image based on the R single color filter at the corresponding pixel groups.

In addition, in response to the RGB color filters being mixed such that 100% of the R (red) color filter collects light and 50% of the G (green) color filter collects light during the exposure time of the sensor, the photographing apparatus 100 may be configured to acquire an orange color image. In addition, in response to the RGB color filters being combined such that 80% of the R (red) color filter collects light and 100% of the B (blue) single color filter collects light during the exposure time of the sensor, the photographing apparatus 100 may be configured to acquire a purple image. In addition, in response to the RGB color filters being combined in the same ratio indicating the same intensity, the photographing apparatus 100 may be configured to acquire a natural color (white) image. In this example, the photographing apparatus 100 may control the frequency of the exposure on/off state (duty ratio) of each of the pixel groups based on a combination of the RGB color filters. The above-described examples are merely example embodiments provided to explain the present disclosure, and should not be considered as limiting. In addition, the RGB array may be expanded to various arrays (for example, 8×8 array, 16×16 array, etc.)

Figure 4:
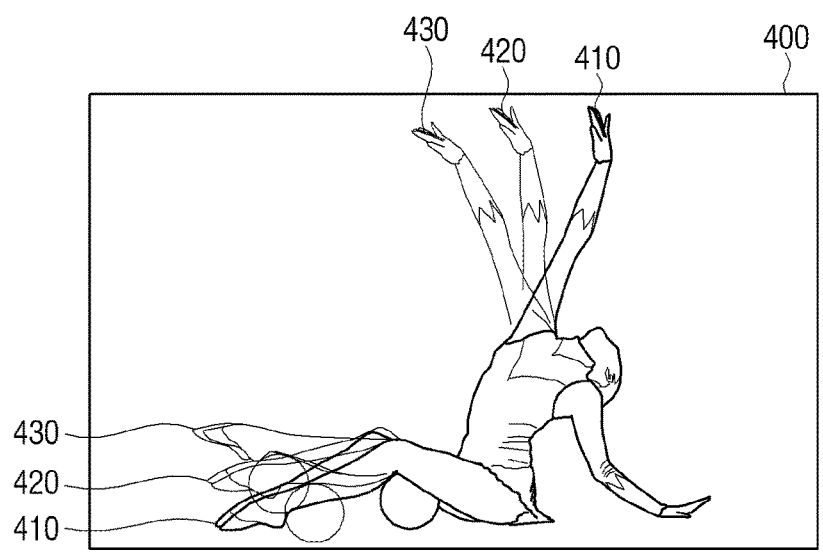
FIG. 4 is a diagram illustrating an example moving subject which is photographed in a multiple exposure mode.

FIG. 4 is a diagram illustrating an example moving subject which is photographed in a multiple exposure mode. Referring to FIG. 4, in the multiple exposure modes, the photographing apparatus 100 may store segmented motions of the moving subject as one sheet of image, and display one sheet of image on the display 400.

According to an example embodiment, the photographing apparatus 100 may distinguish a first motion 410, a second motion 420, and a third motion 430 of the subject from one another based on a color filter of each color or each area. For example, the photographing apparatus 100 may display the first motion 410 in red, the second motion 420 in purple, and third motion 430 in blue based, for example, on a user's selection to distinguish them from one another.

As illustrated in FIG. 4, in response to different motions 410, 420, 430 being displayed on the display 400 of the photographing apparatus 100, the red for distinguishing the first motion 410 from the other motions of the subject may be displayed on the first place of a time bar (not shown) of the photographing apparatus 100, the purple for distinguishing the second motion 420 may be displayed on the second place of the time bar (not shown) of the photographing apparatus 100, and the blue for distinguishing the third motion 430 may be displayed on the third place of the time bar (not shown) of the photographing apparatus 100. Through this, the user can easily identify the sequence of continuous motions of the moving subject through colors. However, this is merely an example embodiment provided to explain the present disclosure, and this should not be considered as limiting. Various example embodiments will be explained below.

Figure 5:
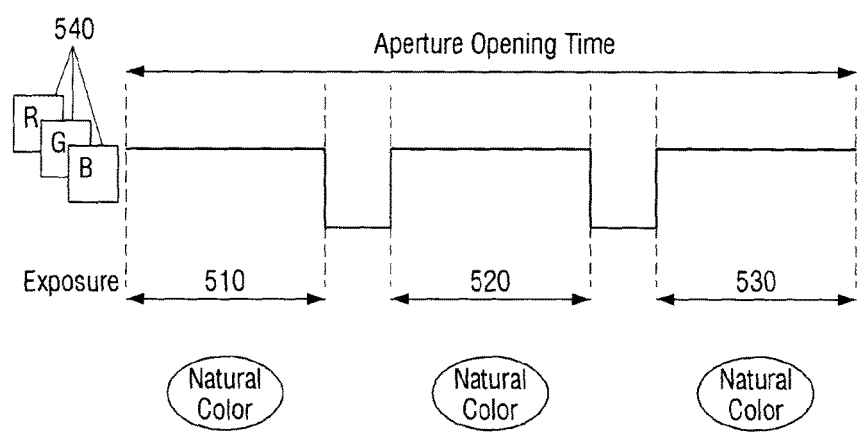
FIG. 5 is a timing chart illustrating example exposure on/off which is applied in all of a plurality of pixel groups of a plurality of pixel areas of a related-art image sensor during an aperture opening time.

FIG. 5 is a timing chart illustrating an example exposure on/off applied in a plurality of pixel areas of a related-art image sensor during an aperture opening time. The related-art image sensor refers to a multiple exposure image sensor (for example, a CMOS) of a photographing apparatus using a global shutter method.

Referring to FIG. 5, the segmented motions 410, 420, and 430 of the subject are distinguished by pixel groups 510, 520, and 530, respectively. For example, the first motion 410 in FIG. 4 is distinguished by the first pixel group 510, the second motion 420 in FIG. 4 is distinguished by the second pixel group 520, and the third motion 430 in FIG. 4 is distinguished by the third pixel group 520. In this example, each of the pixel groups may not be distinguished by a color filter of each color or each area, and may apply a color filter in which RGB color filters are combined with the same intensity. In addition, the pixel groups 510, 520, and 530 may be turned on during a first exposure time 510, a second exposure time 520, and a third exposure time 530, respectively, but the same exposure time is applied. Accordingly, in the related-art method, it is difficult to know the temporal sequence of the segmented motions 410, 420, and 430 of the subject.

Figure 6:
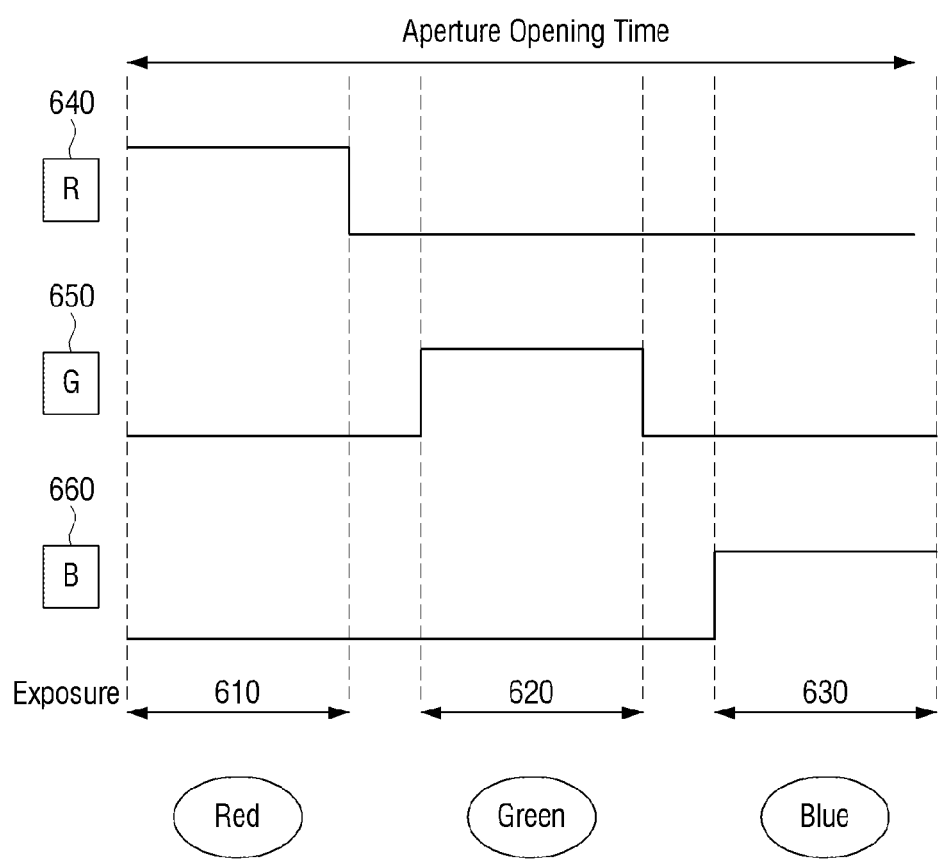
FIGS. 6 and 7 are timing charts illustrating example exposure on/off which is applied to pixel groups which are distinguished by color filters of a plurality of pixels.
Figure 7:
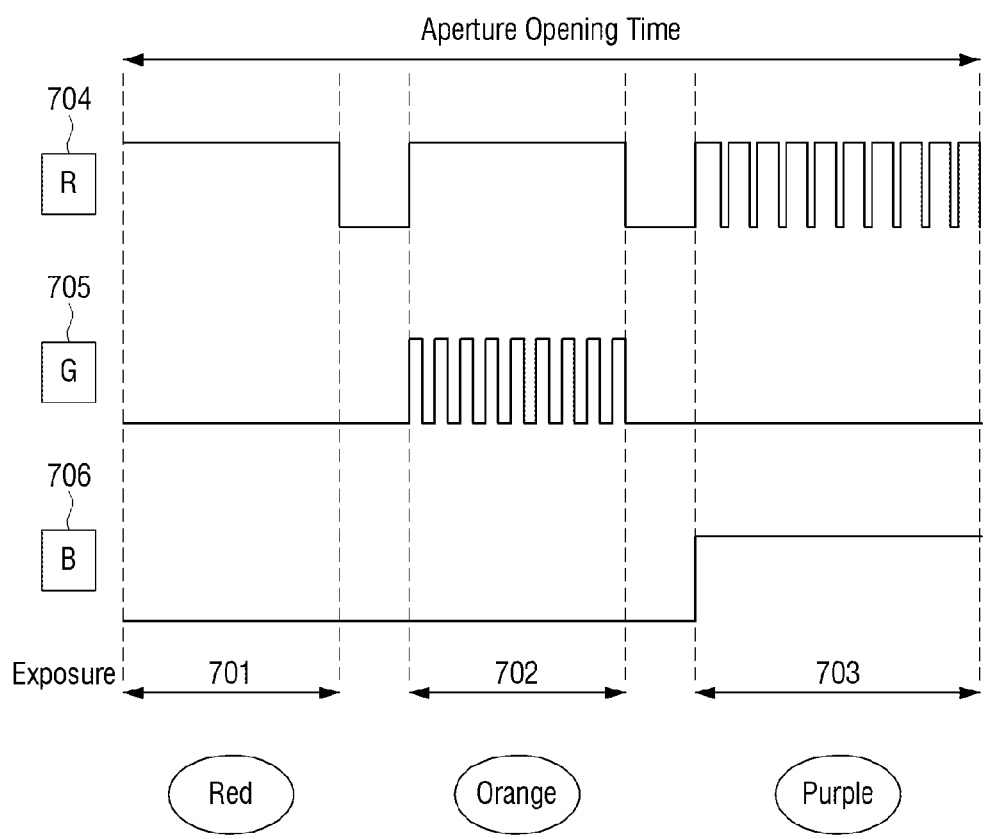

FIGS. 6 and 7 are timing charts illustrating example exposure on/off which is applied to pixel groups which are distinguished by color filters of a plurality of pixels.

Referring to FIG. 6, the segmented motions 410, 420, and 430 of the subject shown in FIG. 4 are distinguished from one another by pixel groups 610, 620, and 630. For example, the first motion 410 of FIG. 4 is distinguished by the first pixel group 610, the second motion 420 of FIG. 4 is distinguished by the second pixel group 620, and the third motion 430 of FIG. 4 is distinguished by the third pixel group 630. In this example, each of the pixel groups may be distinguished by a color filter of each color and may apply a single color filter of each color.

For example, the first motion 410 of FIG. 4 may be distinguished by the first pixel group having an R color filter 640 in a first section 610. The second motion 420 of FIG. 4 may be distinguished by the second pixel group having a G color filter 650 in a second section 620. In addition, the third motion 430 of FIG. 4 may be distinguished by the third pixel group having a B color filter 660 in a third section 630.

In this example, the photographing apparatus 100 may be configured to turn on the pixel groups 610, 620, and 630 during exposure times 610, 620, 630 corresponding to the pixel groups, respectively, and turn off the pixel groups during the other exposure times. As a result, the R single color filter 640 is applied to the first motion 410 of FIG. 4 such that the first motion 410 is displayed in red, the G single color filter 650 is applied to the second motion 420 of FIG. 4 such that the second motion 420 is displayed in green, and the B single color filter 660 is applied to the third motion 430 of FIG. 4 such that the third motion 430 is displayed in blue.

In this example, the photographing apparatus 100 may display one sheet of image in which the segmented motions 410, 420, and 430 are distinguished by colors, and a time bar corresponding to the colors of the respective motions. Through this, the user can easily determine the temporal sequence of the segmented motions of the moving subject through colors. However, this is merely an example embodiment provided to explain the present disclosure and the present disclosure may be implemented using selection of various color filters.

Referring to FIG. 7, the segmented motions 410, 420, and 430 of the subject shown in FIG. 4 are distinguished by color filters which are applied to the first to third sections 701, 702, 703 which are exposure times corresponding to the segmented motions. For example, the first motion 410 of FIG. 4 may be distinguished by the first section 701, the second motion 420 of FIG. 4 may be distinguished by the second section 702, and the third motion 430 of FIG. 4 may be distinguished by the third section 703. In this example, each of the pixel groups 704, 705, and 706 may be distinguished by a color filter of each color, and a combination color filter which is obtained by combining RGB color filters may be applied to each of the pixel groups.

For example, the first motion 410 of FIG. 4 may be distinguished by a first color having the R color filter 704 in the first section 701. The second motion 420 of FIG. 4 may be distinguished by a second color in which the R color filter 704 and the G color filter 705 are combined in the second section 702. The third motion 430 of FIG. 4 may be distinguished by a third color in which the R color filter 704 and the B color filter 706 are combined in the third section 703.

In this example, the photographing apparatus 100 may be configured to turn on the pixel groups 701, 702, 703 during exposure times 701, 702, 703 corresponding to the pixel groups, and turn off the pixel groups during the other exposure times. As a result, the R single color filter 704 is applied to the first motion 410 of FIG. 4 such that the first motion 410 is displayed in red. 100% of the R (red) color filter 704 collects light and 50% of the G (green) color filter 705 collects light during the second exposure time 702, such that the second motion 420 of FIG. 4 is displayed in orange color. In addition, 80% of the R color filter 704 collects light and 100% of the B single color filter 706 collects light during the third exposure time 703 such that the third motion 430 of FIG. 4 is displayed in purple. In this example, the photographing apparatus 100 may be configured to control the duty ratio which is the frequency of the exposure on/off state of each of the pixel groups 704, 705, and 706 based on a combination of the RGB color filters.

In addition, the photographing apparatus 100 may overlay one sheet of image in which the segmented motions 410, 420, and 430 are distinguished by colors with a time bar corresponding to the colors of the respective motions. Through this, the user can easily determine the temporal sequence of the segmented motions of the moving subject through various colors. However, this is merely an example embodiment provided to explain the present disclosure, and the present disclosure may be implemented using various colors by combining the RGB color filters at various ratios.

Figure 8:
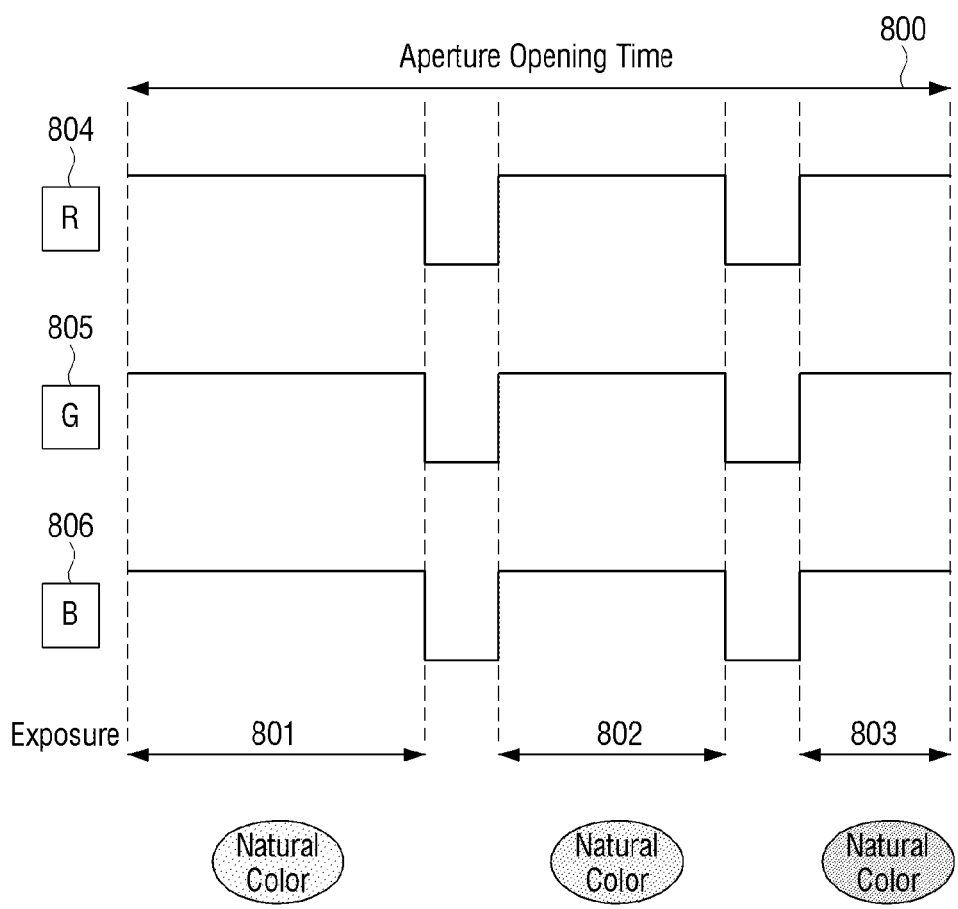
FIGS. 8 and 9 are timing charts illustrating example exposure on/off which is applied to represent an effect of a change in brightness by controlling pixel groups which are distinguished by colors of a plurality of pixels.
Figure 9:
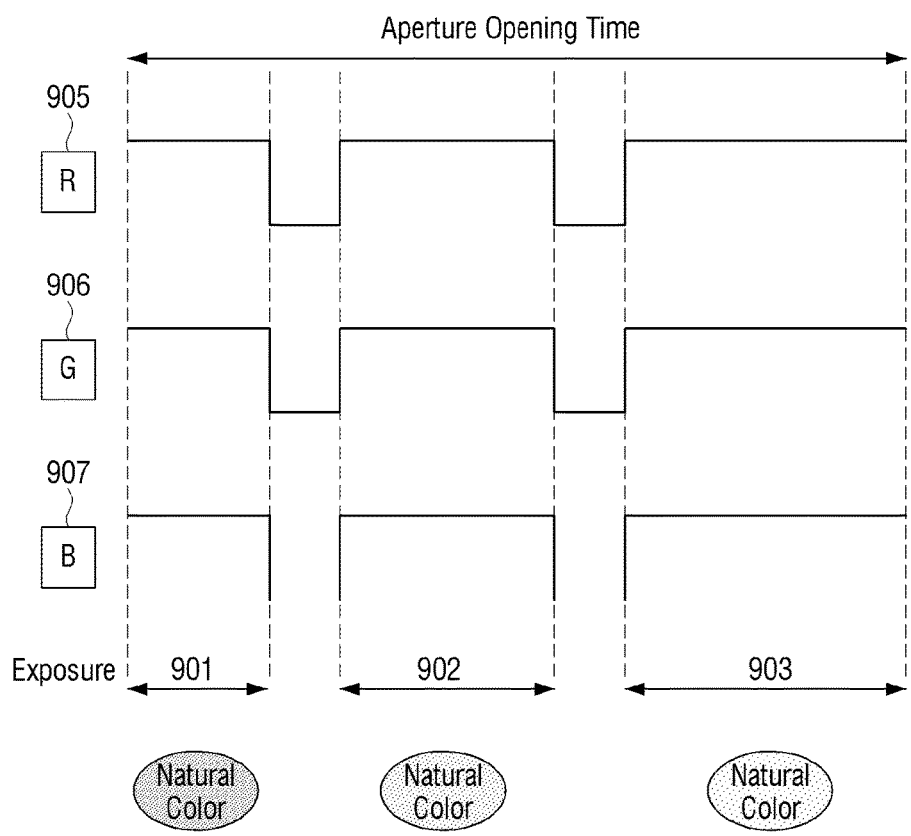

FIGS. 8 and 9 are timing charts illustrating example exposure on/off applied to represent an effect of a change in brightness by controlling pixel groups which are distinguished by colors of a plurality of pixels.

FIG. 8 is a timing chart illustrating example segmented motions of a moving subject which become darker in a temporal sequence. Referring to FIG. 8, the segmented motions 410, 420, and 430 of the subject shown in FIG. 4 are distinguished by first to third sections 801, 802, and 803 which are exposure times corresponding to the respective segmented motions. For example, the first motion 410 of FIG. 4 may be distinguished by the first section 801, the second motion 420 of FIG. 4 may be distinguished by the second section 802, and the third motion 430 of FIG. 4 may be distinguished by the third section 803. In this example, different brightness may be applied to the segmented motions 410, 420, and 430 based on the length of the exposure time of the pixel groups 804, 805, and 806.

In response to the RGB color filters being combined to have the same light collection ratio of 100% in each of the exposure times 801, 802, 803 during an aperture opening time 800, the photographing apparatus 100 may acquire an image of natural color (white). In addition, the acquired natural color (white) may have different intensity or brightness of color based on the length of the exposure time. For example, in a long exposure section in which the exposure time is set to 1 second, bright natural color may be generated, and in a medium exposure section in which the exposure time is set to 0.5 second, natural color of medium brightness may be generated. In a short exposure section in which the exposure time is set to 0.001 second, a darkest natural color may be generated. The exposure time is merely an example provided to explain example embodiments, and is not limited to this and may be implemented variously.

For example, the photographing apparatus 100 may acquire an image represented by the natural color by combining the R pixel group 804, the G pixel group 805, and the B pixel group 806 to have the same light collection ratio of 100% in the first to third sections 801, 802, and 803 which are exposure sections corresponding to the first to third motions 410, 420, and 430 of FIG. 4. In addition, the photographing apparatus 100 may be configured to turn on the pixel groups 804, 806, and 806 in the exposure sections 801, 802, and 803 corresponding to the pixel groups, and turn off the pixel groups during the other exposure times. In addition, the photographing apparatus 100 may be configured to control the brightness of the natural color (white) by differently controlling the lengths of the exposure times of the exposure sections 801, 802, and 803 corresponding to the pixel groups 804, 805, and 806.

Referring to FIG. 8, the segmented motions 410, 420, and 430 of the subject shown in FIG. 4 are distinguished by the first to third sections 801, 802, and 803 which are exposure times corresponding to the segmented motions. The first section 801 which is a first exposure time has the longest length in comparison with the second section 802 which is a second exposure time and the third section 803 which is a third exposure time. In addition, the second section 802 is longer than the third section 803. For example, the first exposure time 801, the second exposure time 802, and the third exposure time 803 may be referred to as a long exposure, a medium exposure, and a short exposure, respectively.

As a result, the long exposure 801 is applied to the first motion 410 of FIG. 4 such that the first motion 410 is displayed in a brightest natural color (white). In addition, the medium exposure 802 is applied to the second motion 420 of FIG. 4 such that the second motion 420 is displayed in natural color (white) of medium brightness. The short exposure 803 is applied to the third motion 430 such that the third motion 430 is displayed in a darkest natural color (white).

In addition, the photographing apparatus 100 may display the segmented motions 410, 420, 430 on one sheet of image by overlaying one sheet of image in which the motions 410, 420, and 430 are distinguished by brightness/sharpness based on the intensity of the natural color (white) with a time bar corresponding to the brightness/sharpness of each of the motions. According to an example embodiment of FIG. 8, the segmented motions 410, 420, and 430 may be displayed in order of becoming darker. For example, the first motion 410 is displayed most brightly, the second motion 420 is displayed with medium brightness, and the third motion 430 is displayed most darkly, so that the temporal sequence of the motions 410, 420, and 430 can be known based on the order of brightness. However, this is merely an example embodiment provided to explain the present disclosure, and the exposure time for each of the pixel groups may be implemented in various ways.

FIG. 9 is a timing chart illustrating example segmented motions of a moving subject which become brighter in a temporal sequence. Referring to FIG. 9, the segmented motions 410, 420, and 430 of the subject shown in FIG. 4 are distinguished by first to third sections 901, 902, and 903 which are exposure times corresponding to the respective segmented motions. For example, the first section 901 which is a first exposure time has the shortest length in comparison with the second section 902 which is a second exposure time and the third section 903 which is a third exposure time. In addition, the second section 902 is shorter than the third section 903. For example, the first exposure time 901, the second exposure time 902, and the third exposure time 903 may be referred to as a short exposure, a medium exposure, and a long exposure, respectively.

As a result, the short exposure 901 is applied to the first motion 410 of FIG. 4 such that the first motion 410 is displayed in a darkest natural color (white). In addition, the medium exposure 902 is applied to the second motion 420 of FIG. 4 such that the second motion 420 is displayed in natural color (white) of medium brightness. The long exposure 903 is applied to the third motion 430 of FIG. 4 such that the third motion 430 is displayed in a brightest natural color (white).

In addition, the photographing apparatus 100 may display the segmented motions 410, 420, 430 on one sheet of image by overlaying one sheet of image in which the motions 410, 420, and 430 are distinguished by brightness/sharpness based on the intensity of the natural color (white) with a time bar corresponding to the brightness/sharpness of each of the motions. According to an example embodiment of FIG. 9, the segmented motions 410, 420, and 430 may be displayed in order of becoming brighter. For example, the first motion 410 is displayed most darkly, the second motion 420 is displayed with medium brightness, and the third motion 430 is displayed most brightly, so that the temporal sequence of the motions 410, 420, and 430 can be known based on the order of brightness. However, this is merely an example embodiment provided to explain the present disclosure, and the exposure time for each of the pixel groups may be implemented in various ways.

In addition, an off state section in which an exposure is not performed exists in each exposure section. For example, referring to FIG. 9, an exposure off state exists between the first section 901 and the second section 902, and an exposure off state exists between the second section 902 and the third section 903. According to example embodiments, the exposure off state exists between all of the exposure sections. In this example, in the exposure off state section in which an exposure is not performed between the sections, all of the pixel groups (R, G, and B) may be turned on or off. In addition, the length of the exposure off state section in which an exposure is not performed between sections may vary. The variation of the length may be determined considering a timer interval in proportion to the total exposure time or the exposure time after or before the off state section. However, this is merely an example embodiment provided to explain the present disclosure, and should not be considered as limiting and may be implemented in various ways.

Figure 10:
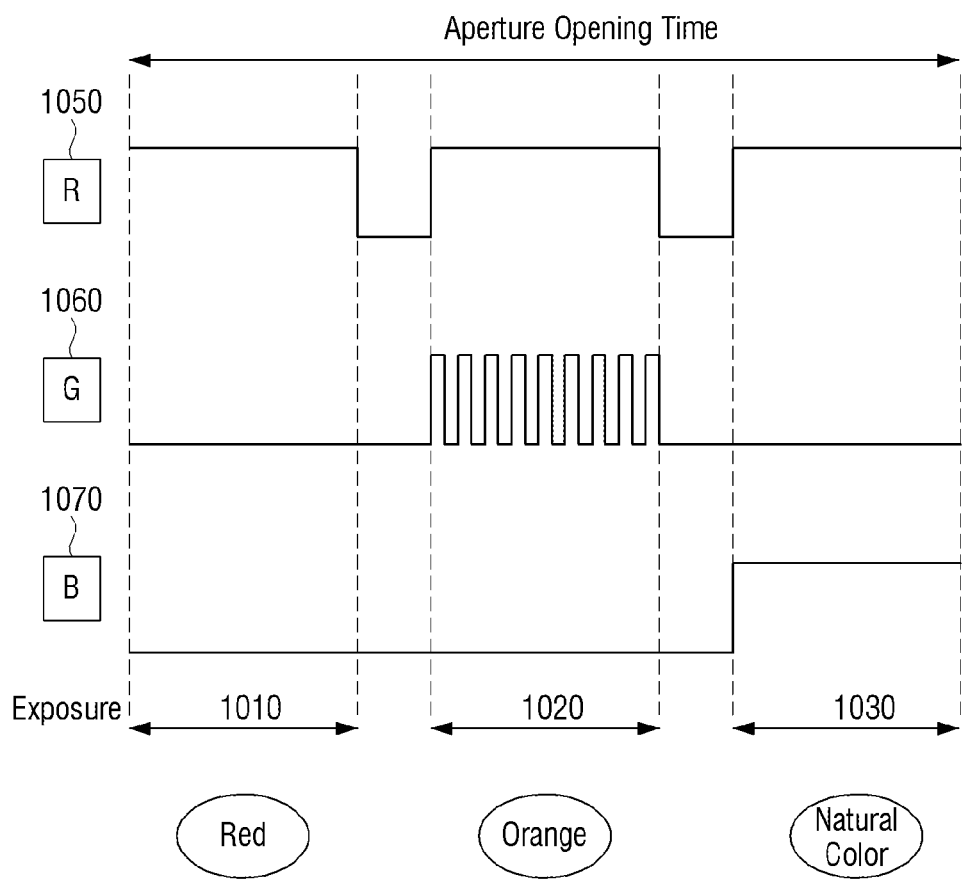
FIGS. 10 and 11 are timing charts illustrating example exposure on/off which is applied to pixel groups distinguished by colors to photograph a specific event estimated while photographing a brightness changing effect in a specific color or natural color (white)
Figure 11:
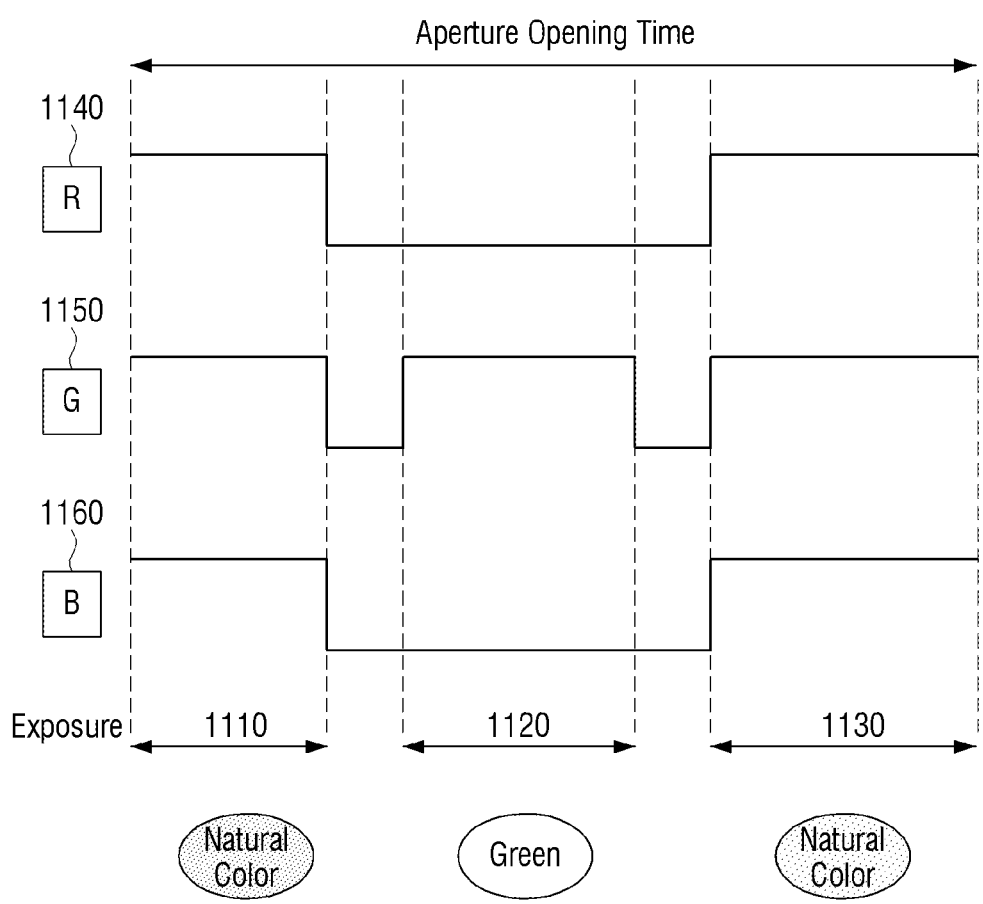

FIGS. 10 and 11 are timing charts illustrating an example exposure on/off which is applied to pixel groups distinguished by colors to photograph a specific event estimated while photographing a brightness changing effect in a specific color or natural color (white).

According to an example embodiment, the photographing apparatus 100 may detect a background color in a live view state prior to opening an aperture in order to distinguish a subject having a movement from the color of a background image (sub-image). In this example, the photographing apparatus 100 may include a process of excluding a color of the subject similar to the detected background color from the motion colors of the subject to be outputted. In addition, the photographing apparatus 100 may exclude a color similar to the color of the subject from colors to represent segmented motions of the subject.

For example, the photographing apparatus 100 may photograph two moving persons who are playing baseball on the lawn. For example, the photographing apparatus 100 may capture the lawn which is a background screen, a first object which is a pitcher, a second object which is a defender, and a third object which is a baseball bat through the image sensor. In this example, the photographing apparatus 100 may analyze a live view image which is captured through the image sensor prior to receiving an input of a photographing command, and detect the background color of the lawn which is the background screen as green and detect the colors of the pitcher and the catcher.

In addition, the photographing apparatus 100 may exclude the detected lawn color (green) and the colors of the pitcher and the catcher from colors for distinguishing motions of the pitcher and the catcher based on a predetermined setting value. Alternatively, the photographing apparatus 100 may be set not to have a difference between the detected color and the colors for distinguishing the motions of the pitcher and the catcher based on, for example, a user's command. For example, as illustrated in FIGS. 8 and 9, the photographing apparatus 100 may set the exposure times of the RGB color filters in the pixel groups to be the same to output natural colors (white) for the images of the pitcher and the catcher.

As described in FIGS. 8 and 9, the image intensity of each of the pixel groups may vary based on the length of the exposure on time of the RGB pixel groups. In this example, as the exposure on time increases, the image becomes brighter. Using this, the photographing apparatus 100 may display the temporal sequence of the segmented motions of the pitcher and the catcher based on the image intensity of the natural color by controlling the exposure on time of the pixel groups.

In addition, according to another example embodiment, the photographing apparatus 100 may estimate that a specific event will occur in the movement of the subject by analyzing the live view image prior to receiving a photographing command. In this example, the photographing apparatus 100 may define the start and the end of the exposure during the exposure on time. In addition, the photographing apparatus 100 may set the exposure on/off ratio during the aperture opening time as described in FIG. 7.

For example, when photographing the motions 410, 420, and 430 of a rhythmic gymnast who is doing gymnastics with a ball as illustrated in FIG. 4, the photographing apparatus 100 may analyze various movement patterns and may estimate an event time of a moment 430 when the ball is separated from the gymnast's body based on a pre-stored movement trajectory or movement speed data. In this example, in response to the event 430 of the moment when the ball is separated from the gymnast's body being estimated, the photographing apparatus 100 may differently control the exposure on/off time of the RGB pixel groups of other motions 410 and 420 distinguishing the movement of the gymnast and the motion 430 of the estimated moment.

The example embodiment will be explained in greater detail below with reference to FIGS. 10 and 11. Referring to FIG. 10, the first motion 410 of FIG. 4 may be distinguished by an R single color filter 1050 in a first section 1010 which is a first exposure time, the second motion 420 may be distinguished by a combination color filter of the R color filter 1050 and a G color filter 1060 in a second section 1020 which is a second exposure time, and the third motion 430 may be distinguished by an RGB combination color filter 1050, 1060, and 1070 in a third section 1030 which is a third exposure time.

In this example, in the third section 1030 corresponding to the third motion 430, in which the specific event is estimated, all of the RGB color filters are controlled to turn on/off the exposure during the same time, unlike in the first section 1010 and the second section 1020 which are distinguished by colors of the RGB color filters. For example, the photographing apparatus 100 may acquire one sheet of image in which the first motion 410 of FIG. 4 is expressed in red, the second motion 420 is expressed in orange color, and the third motion 430 is expressed in natural color (white).

According to another example embodiment, referring to FIG. 11, the photographing apparatus 100 my set an event of a moment when the movement of the subject starts and an event of a moment when the movement of the subject finishes as important event moments based on a pre-defined setting or user setting. In this example, prior to receiving a photographing command, the photographing apparatus 100 may estimate the start and the end of the movement of the subject by analyzing the live view image.

For example, as illustrated in FIG. 11, the photographing apparatus 100 may determine the first motion 410 which is an event of a moment when the movement of the rhythmic gymnast of FIG. 4 starts, and the third motion 430 which is an event of a moment when the ball is separated from the gymnast's body as specific events. In this example, the first motion 410 of FIG. 4 may be distinguished by a first section 1110, the second motion 420 may be distinguished by a second section 1120, and the third motion 430 may be distinguished by a third section 1130.

In addition, in the first section 1110 and the third section 1130 which are the important event moments, the segmented motions of the gymnast may be expressed in natural color (white) by turning on all of the RGB pixel groups during the same time. In this example, the photographing apparatus 100 may control the exposure time of the third section 1130 to be longer than the first section 1110. For example, at the moment 430 when the specific event finishes, the sharpness of the image is higher than at the moment 410 when the specific event starts.

In addition, the photographing apparatus 100 may apply specific color to a specific motion by distinguishing the exposure time by color of the RGB color filter in the motion 420 which distinguishes a movement rather than the movements at the important event moments. The G single pixel group is applied to the second motion in the second section 1120 such that the second motion of FIG. 4 is expressed in green.

However, the example embodiments of FIGS. 10 and 11 are merely example embodiments provided to explain the present disclosure, and the present disclosure is not limited to these embodiments. The photographing apparatus 100 may acquire an image by controlling the length of the exposure time and the RGB filter pixels according to various methods and techniques.

Figure 12:
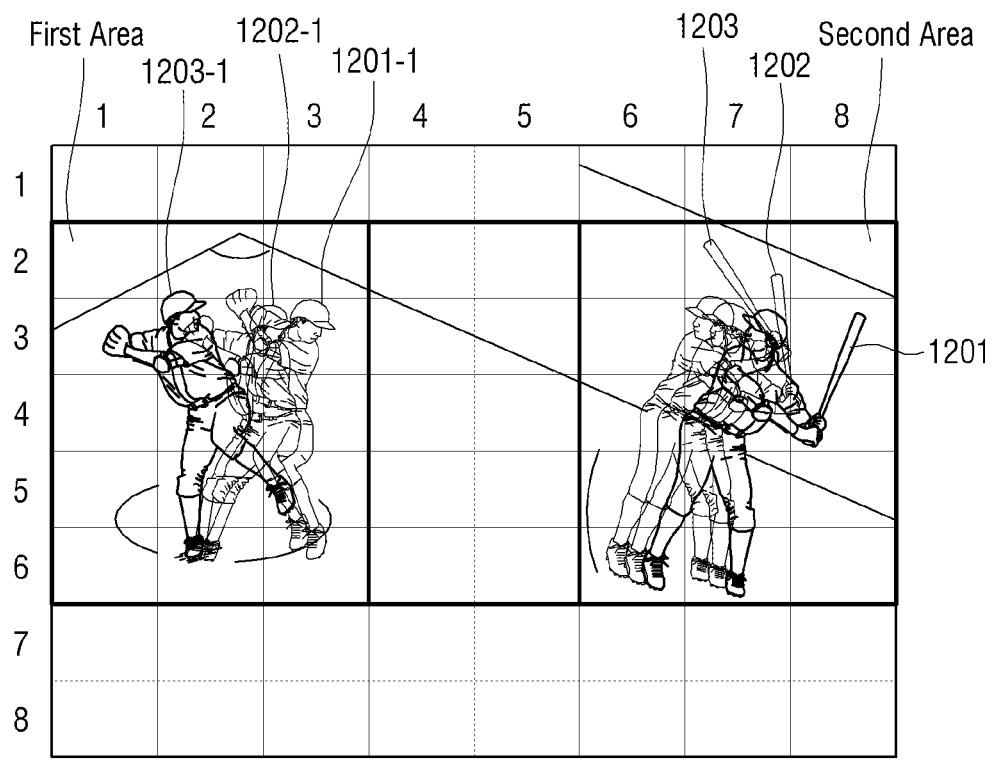
FIG. 12 is a diagram illustrating example pixel groups which are distinguished by an area of a plurality of pixels.

FIG. 12 is a diagram illustrating example pixel groups which are distinguished by color filters in an area of a plurality of pixels. Referring to FIG. 12, in an 8×8 Bayer pixel pattern, areas occupied by a moving subject in a first area includes areas at matrix locations (2,2), (3,1), (3,2), (3,3), (4,1), (4,2), (4,3), (5,1), (5,2), (5,3), (6,1), (6,2) and (6,3). In addition, areas occupied by a moving subject in a second area include areas at matrix locations (2,7), (3,6), (3,7), (3,8) (4,6), (4,7), (4,8), (5,6), (5,7), (6,6), and (6,7). The photographing apparatus 100 may distinguish the pixel groups of the subjects in the first area and the second area. For example, the pixel groups may be distinguished according to motions of the subjects moving in the first area and the second area. (for example, first to third pixel groups 1201-1 to 1203-1 of the first area and first to third pixel groups 1201 to 1203 of the second area)

In addition, the pixel groups may be distinguished by subjects moving at the same time in the first area and the second area. (for example, the first pixel group 1201, 1202-1, the second pixel group 1202, 1202-1, and the third pixel group 1203, 1203-1) In addition, the photographing apparatus 100 may be configured to express a motion corresponding to each of the pixel groups in different color and with different brightness, which is an intensity of an image, by differently applying a combination of the color filters and exposure on/off according to the pixel group.

FIGS. 13A, 13B, 14A and 14B are timing charts illustrating example exposure on/off applied to display different color or brightness in the pixel groups of color filters of each area according to an area.

Figure 13A:
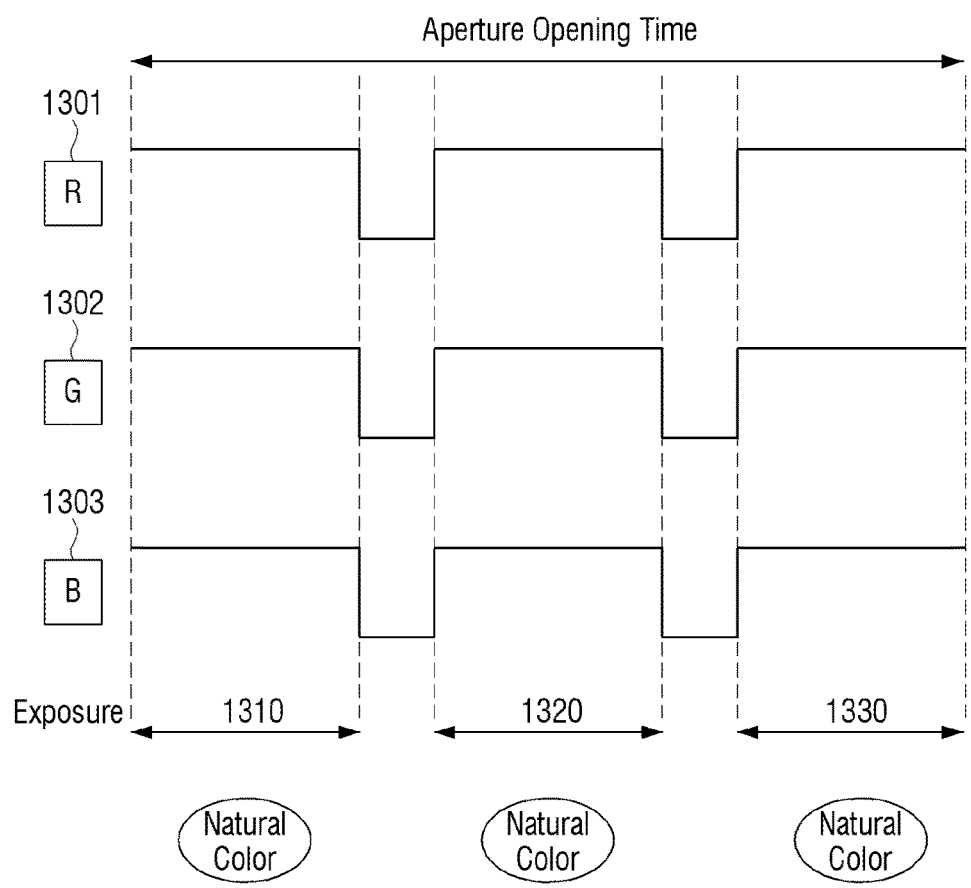
FIGS. 13A, 13B, 14A and 14B are timing charts illustrating example exposure on/off which is applied to display different color or brightness in the pixel groups of each area according to an area.

FIG. 13A is a timing chart illustrating segmented motions of the subject belonging to the pixel groups of the first area of FIG. 12 in natural color (white) according to an example embodiment. Referring to FIG. 13A, the first movement 1201-1 of FIG. 12 may be distinguished by a first section 1310 which is a first exposure time corresponding to the first movement 1201-1, the second movement 1202-1 of FIG. 12 may be distinguished by a second section 1320 which is a second exposure time corresponding to the second movement 1202-1, and the third movement 1203-1 of FIG. 12 may be distinguished by a third section 1330 which is a third exposure time corresponding to the third movement 1203-1.

In addition, the photographing apparatus 100 may be configured to expose all of the RGB pixel groups 1301, 1302, and 1303 and control the exposure times 1310, 1320, and 1330 of the RGB pixel groups 1301, 1302, 1303 to be the same to express the movements in natural color (white) during the exposure times 1310 to 1330. In addition, the photographing apparatus 100 may express the segmented motions 1201-1 to 1203-1 of FIG. 12 with different brightness, which is an intensity of an image, by differently controlling the exposure time of each of the RGB pixel groups 1301, 1302, and 1303 (a long exposure, a medium exposure, a short exposure).

Figure 13B:
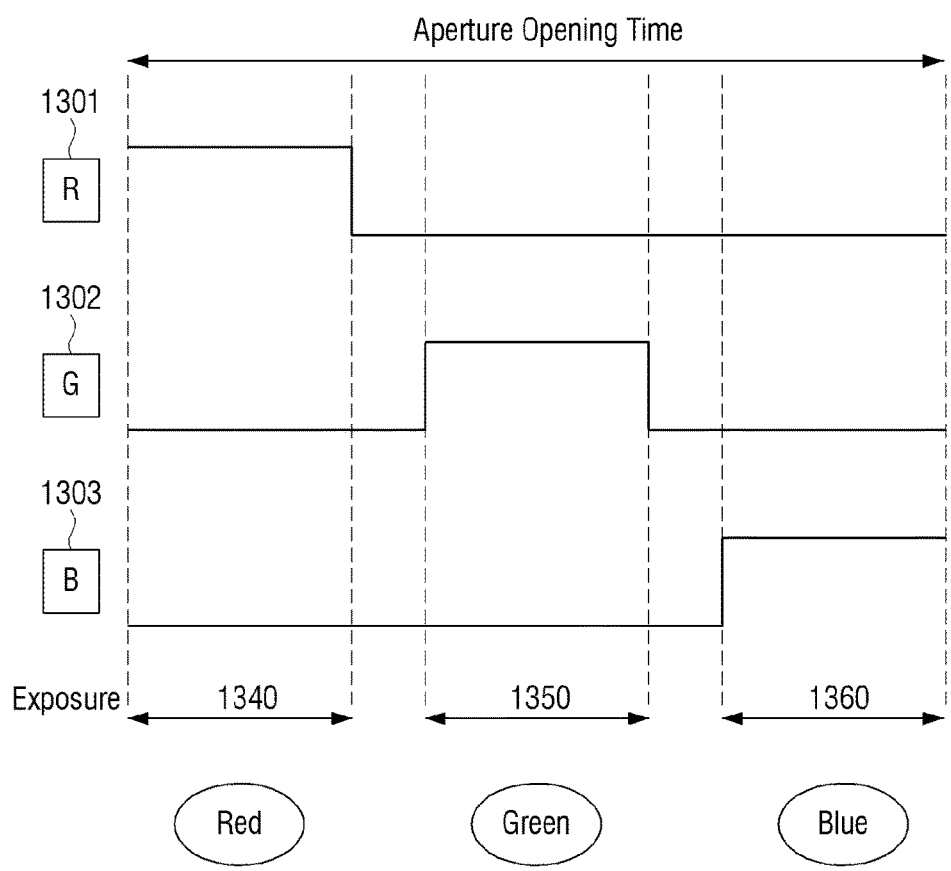

FIG. 13B is a timing chart illustrating segmented motions of the subject belonging to the pixel groups of the second area of FIG. 12 in different color according to an example embodiment. Referring to FIG. 13B, the first movement 1201 of FIG. 12 may be distinguished by a first section 1340 which is a first exposure time corresponding to the first movement 1201, the second movement 1202 of FIG. 12 may be distinguished by a second section 1350 which is a second exposure time corresponding to the second movement 1202, and the third movement 1203 of FIG. 12 may be distinguished by a third section 1360 which is a third exposure time corresponding to the third movement 1203.

In addition, the photographing apparatus 100 may be configured to expose the RGB single color filters 1301, 1302, and 1303 during exposure times 1340 to 1360 corresponding to the pixel groups to express movements in different color. For example, the R single color filter 1301 collects light during the first exposure time 1340 such that the first movement 1201 of FIG. 12 is expressed in red, the G single color filter 1302 collects light during the second exposure time 1350 such that the second movement 1202 is expressed in green, and the B single color filter 1303 collects light during the third exposure time 1360 such that the third movement 1203 is expressed in blue. In addition, the intensity of the image of each of the segmented motions 1201 to 1203 of FIG. 12 may vary by differently controlling the length of the RGB exposure time for each pixel group (a long exposure, a medium exposure, a short exposure).

Accordingly, in the example embodiments in FIGS. 13A and 13B, the photographing apparatus 100 may control the pixel groups to be distinguished based on areas of pixels occupied by movements of different subjects in a single image. In addition, the photographing apparatus 100 may adjust color and an image intensity to distinguish the motions of the different subjects based on the exposure time and the RGB color filter of each area. However, the above-described example embodiments are merely example embodiments provided to explain the present disclosure, and the present disclosure is not limited to these embodiments, and may be extended and applied in various methods and techniques.

Figure 14A:
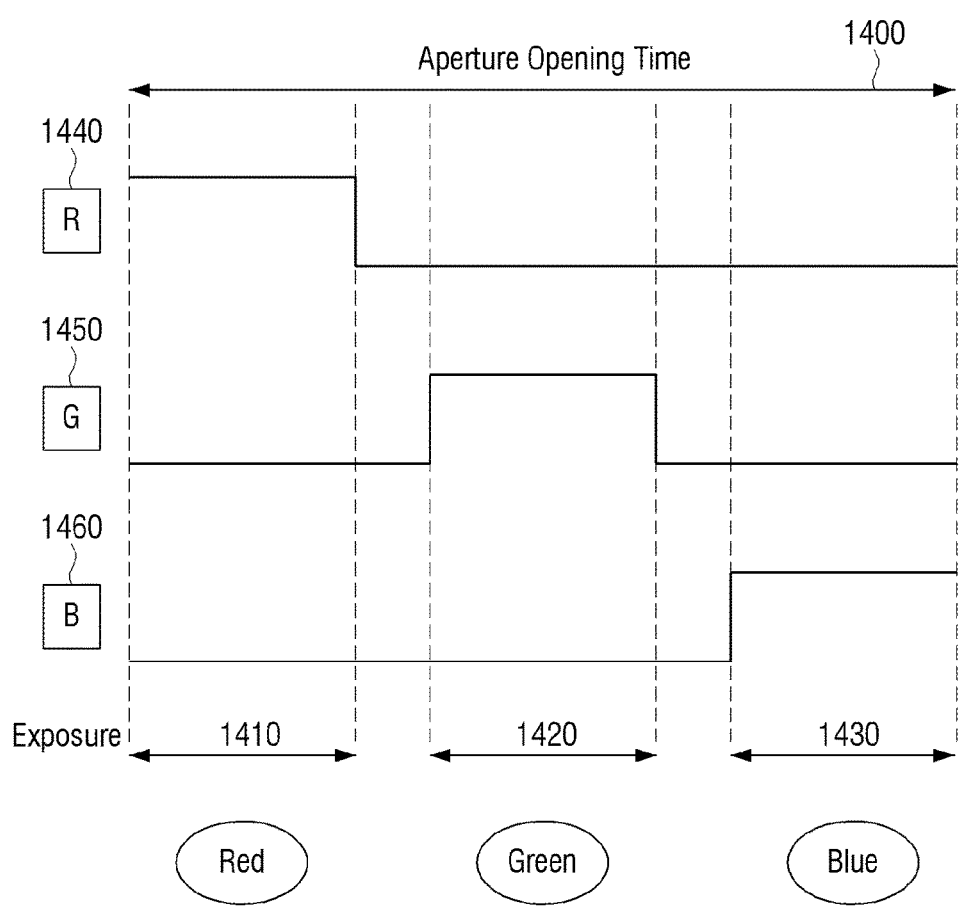

FIG. 14A is a timing chart illustrating an example of distinguishing the pixel groups based on motions of subjects moving at the same time in the first area and the second area of FIG. 12, and express the segmented motions of the subjects in different color according to an example embodiment. Referring to FIG. 14A, the first movements 1201 and 1201-1 of FIG. 12 may be distinguished by a first exposure section 1410, the second movements 1202 and 1202-1 of FIG. 12 may be distinguished by a second exposure section 1420, and the third movements 1203 and 1203-1 of FIG. 12 may be distinguished by a third exposure section 1430.

In addition, the photographing apparatus 100 may be configured to expose the RGB single color filters 1440(R), 1450(G), and 1460(B) during exposure times 1410 to 1430 corresponding to the pixel groups to express the movements in different color. For example, the R single color filter 1440 collects light during the first exposure time 1410 such that the first movements 1201 and 1201-1 of FIG. 12 are expressed in red, the G single color filter 1450 collects light during the second exposure time 1420 such that the second movement 1202 and 1202-1 are expressed in green, and the B single color filter 1460 collects light during the third exposure time 1430 such that the third movement 1203 and 1203-1 are expressed in blue.

In addition, the photographing apparatus 100 may express the segmented motion of the subject in various colors by combining the RGB color filters in the exposure section corresponding to each of the segmented motions. In addition, the photographing apparatus 100 may differently express the intensity of the image of each of the segmented motions of FIG. 12 by differently controlling the length of the RGB exposure time for each pixel group (a long exposure, a medium exposure, a short exposure).

Figure 14B:
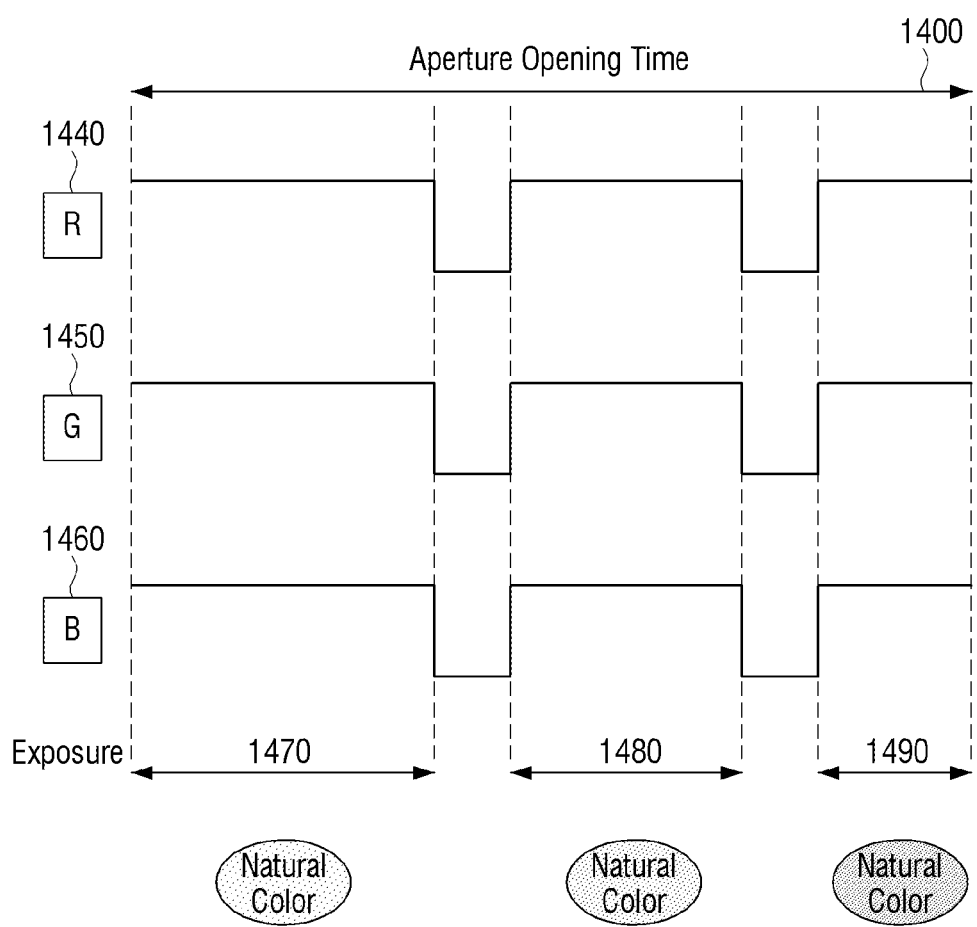

FIG. 14B is a timing chart illustrating an example of distinguishing the pixel groups based on motions of subjects moving at the same time in the first area and the second area of FIG. 12, and express the segmented motions of the subjects in natural color (white). Referring to FIG. 14B, the segmented motions of the subjects are implemented to become darker in the temporal sequence. However, this is merely an example embodiment provided to explain the present disclosure, and the segmented motions of the subject may be implemented to become brighter in the temporal sequence.

As illustrated in FIG. 14B, the first movements 1201 and 1201-1 of FIG. 12 may be distinguished by a first pixel group 1440, the second movements 1202 and 1202-1 of FIG. 12 may be distinguished by a second pixel group 1450, and the third movement 1203 and 1203-1 of FIG. 12 may be distinguished by a third pixel group 1460. In addition, the photographing apparatus 100 may be configured to expose all of the RGB pixel groups 1440, 1450, and 1460 during an aperture opening time 1400 and control the exposure times 1470, 1480, and 1490 of the RGB pixel groups to be the same to express the movements in natural color (white). In addition, the photographing apparatus 100 may express the segmented motions 1201-1 to 1203-1 of FIG. 12 with different brightness by differently controlling the exposure time of each of the RGB pixel groups (a long exposure, a medium exposure, a short exposure).

Accordingly, in the example embodiments of FIGS. 14A and 14B, the photographing apparatus 100 may be configured to distinguish the pixel groups based on areas of pixels occupied by movements of different subjects occurring at the same time in a single image. In addition, the photographing apparatus 100 may adjust color and brightness of an image to distinguish the motions of the subjects at different times based on the exposure time and the RGB color filters of each area. However, the above-described example embodiments are merely example embodiments provided to explain the present disclosure, and the present disclosure is not limited to these embodiments and may be extended and applied in various methods and techniques.

Figure 15:
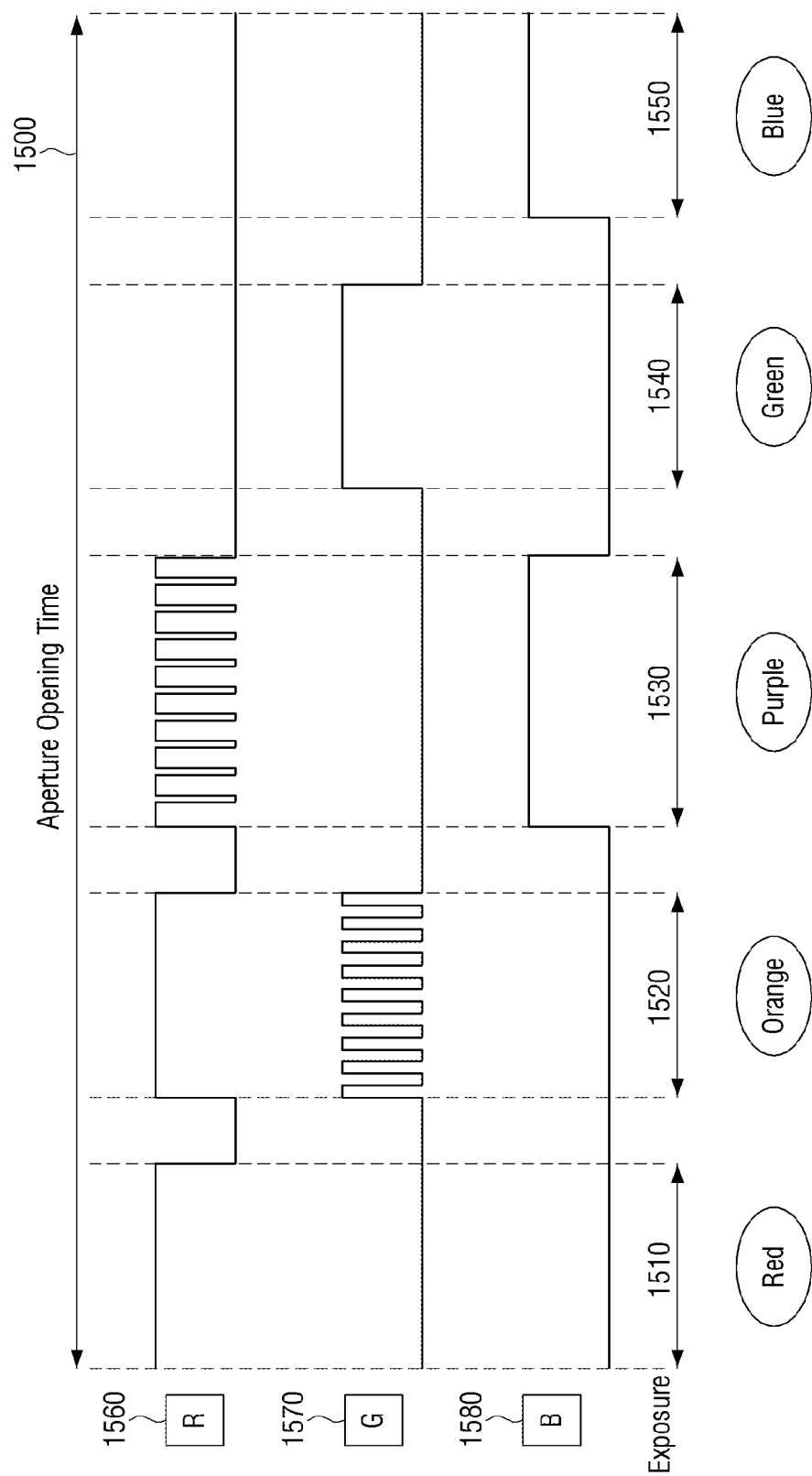
FIGS. 15, 16A and 16B are timing charts illustrating example exposure on/off which is applied to pixel groups according to color or brightness of a subject which has fast movement.
Figure 16A:
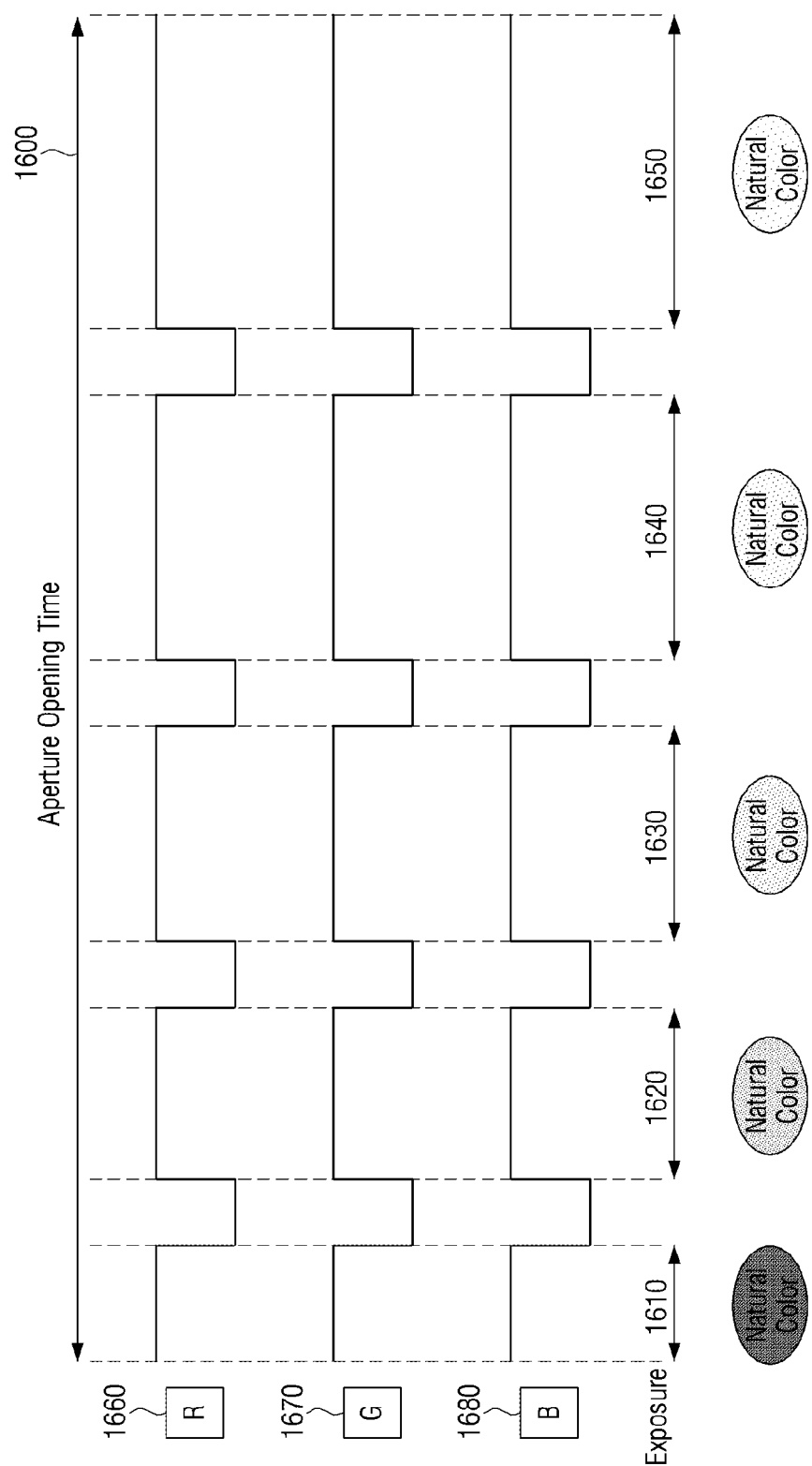
Figure 16B:
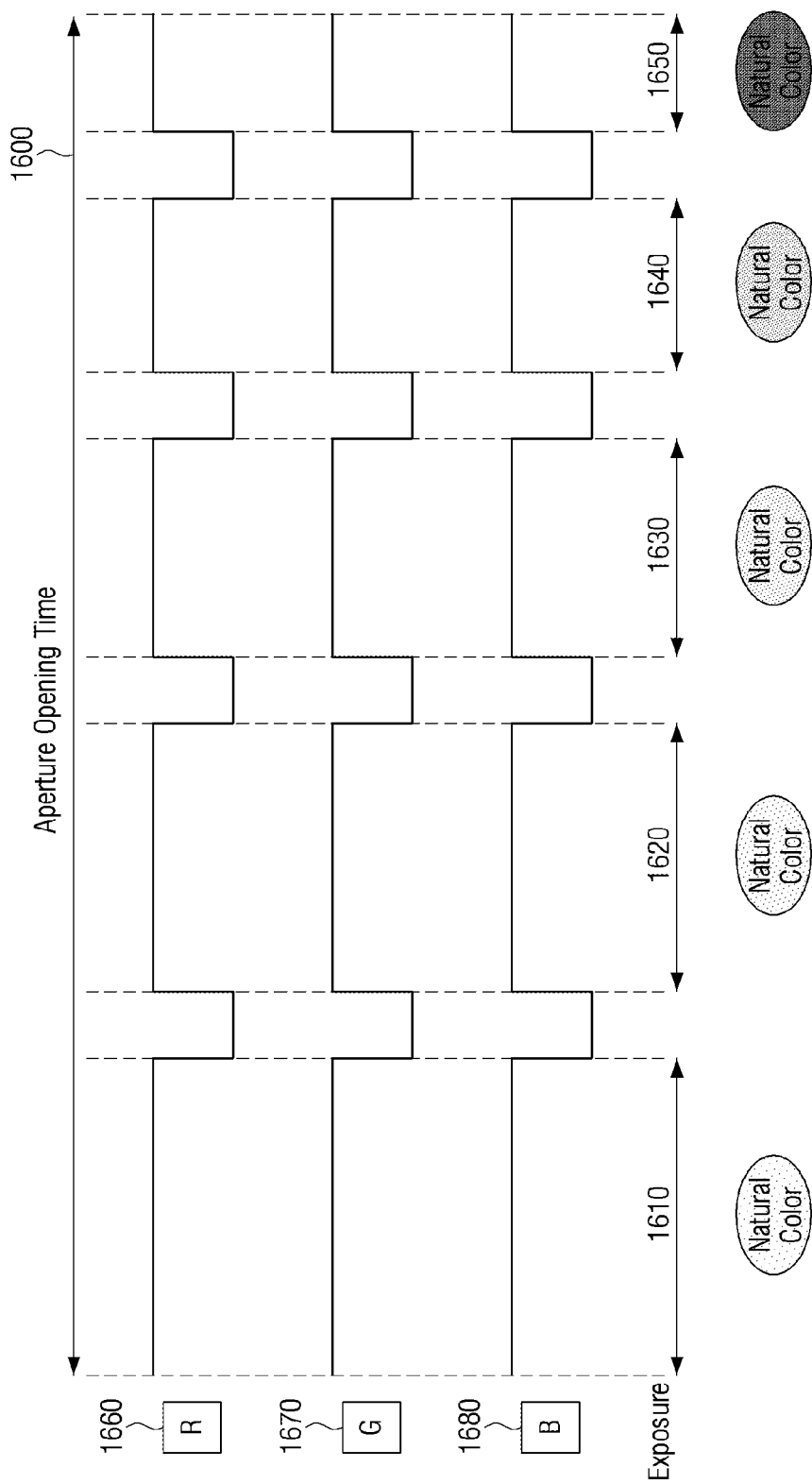

FIGS. 15, 16A and 16B are timing charts illustrating example exposure on/off applied to pixel groups of a subject which has fast or much (e.g., greater than a threshold amount) movement. The photographing apparatus 100 may analyze a speed of movement and an amount of movement of a subject to be photographed based on movement analysis data which is obtained based on movement speeds and trajectories of other subjects that may, for example, be pre-stored. For example, a fast motion may include various motions such as a diving motion, a motion of spinning in the air in gymnastics, etc.

In this example, the photographing apparatus 100 may analyze movement data of a live view image. In addition, in response to the speed of the subject being fast or the subject being moved many times, the photographing apparatus 100 increases the number of times of on/off control of the pixel groups of the sensor during an aperture opening time. Accordingly, the photographing apparatus 100 may express motions captured during a predetermined aperture opening time by a plurality of dense motions.

FIG. 15 is a timing chart illustrating example exposure on/off to express segmented motions of a fast moving subject (for example, a first motion, a second motion, a third motion, a fourth motion, and a fifth motion (not shown)) in different color during an aperture opening time 1500. Referring to FIG. 15, the first motion (not shown) may be distinguished by a first exposure section 1510 corresponding to the first motion, the second motion may be distinguished by a second exposure section 1520, the third motion may be distinguished by a third exposure section 1530, the fourth motion may be distinguished by a fourth exposure section 1540, and the fifth motion may be distinguished by a fifth exposure section 1550. In this example, the exposure sections 1510 to 1550 may be distinguished by color filters based on color, and the segmented motions may be distinguished by various colors using a combination color filter which is obtained by combining the RGB color filters. For example, the photographing apparatus 100 may express the segmented motions in different color in one sheet of image through combination of color filters of the pixel groups applied in the exposure sections corresponding to the respective segmented motions.

For example, the first motion (not shown) may be distinguished by a first color to which an R color filter 1560 is applied in the first section 1510. The second motion (not shown) may be distinguished by a second color in which the R color filter 1560 and a G color filter 1570 are combined in the second section 1520. The third motion (not shown) may be distinguished by a third color in which the R color filter 1560 and a B color filter 1580 are combined in the third section 1530. The fourth motion (not shown) may be distinguished by a fourth color to which the G color filter 1570 is applied in the fourth section 1540. The fifth motion (not shown) may be distinguished by a fifth color to which the B color filter 1580 is applied in the fifth section 1550.

In this example, the photographing apparatus 100 may control each of the segmented motions (not shown) to be on during the exposure time 1510 to 1550 corresponding to each of the segmented motions (not shown), and to be off during the other exposure times. As a result, the R single color filter 1560 is applied to the first motion (not shown) such that the first motion is expressed in red. 100% of the R color filter 1560 collects light and 50% of the G color filter 1570 collects light during the second exposure time 1520 such that the second motion (not shown) is expressed in orange color. In addition, 80% of the R color filter 1560 collects light and 100% of the B single color filter 1580 collects light during the third exposure time 1530 such that the third motion (not shown) is expressed in purple. In this example, the photographing apparatus 100 may control an exposure on/off frequency (duty ratio) of each of the pixel groups according to a combination of the RGB color filters. In addition, the G single color filter 1570 is applied to the fourth motion (not shown) during the fourth exposure time 1540 such that the fourth motion is expressed in green. The B single color filter 1580 is applied to the fifth motion (not shown) during the fifth exposure time 1550 such that the fifth motion is expressed in blue.

In addition, the photographing apparatus 100 may overlay one sheet of image showing the temporal sequence of the motions with color, which is applied by controlling the pixel groups corresponding the motions, with a time bar corresponding to the colors of the respective motions. Through this, the user can easily determine the temporal sequence of the segmented motions of the moving subject through various colors. However, this is merely an example embodiment provided to explain the present disclosure, and the present disclosure may be implemented by using various colors by combining the RGB color filters at various ratios.

FIGS. 16A and 16B are timing charts illustrating example exposure on/off to express segmented motions of a subject moving fast (for example, a first motion, a second motion, a third motion, a fourth motion, and a fifth motion (not shown)) in natural color (white) during an aperture opening time 1600. In this example, the photographing apparatus 100 may control the brightness of an image of a motion corresponding to each of the pixel groups differently by differently applying the length of the exposure time of each of the pixel groups. Accordingly, the photographing apparatus 100 may express the segmented motions with different brightness based on the temporal sequence.

FIG. 16A is a timing chart illustrating example segmented motions of the moving subject which become brighter based on the temporal sequence. For example, becoming brighter may refer, for example, to sharpness of images of the segmented motions of the subject increasing based on the temporal sequence. Referring to FIG. 16A, the first motion may be distinguished by a first exposure section 1610, the second motion may be distinguished by a second exposure section 1620, the third motion may be distinguished by a third exposure section 1630, the fourth motion may be distinguished by a fourth exposure section 1640, and the fifth motion may be distinguished by a fifth exposure section 1650.

In addition, the segmented motions (first to fifth motions) (not shown) of the subject may be distinguished by brightness applied to the segmented motions through exposure on/off control of the pixel groups applied to the exposure sections 1610 to 1650 corresponding to the segmented motions. In this example, the segmented motions corresponding to the exposure sections 1610 to 1650 may be expressed in natural color (white) by combining the RGB color filters 1660, 1670, and 1680 at the same ratio.

In this example, the first exposure time 1610 has the shortest length and the fifth exposure time 1650 has the longest length. As shown in FIG. 16A, the length of the exposure time increases from the first motion corresponding to the first exposure section 1610 to the fifth motion corresponding to the fifth exposure section 1650.

For example, the first exposure time 1610 may be referred to as a short exposure and the fifth exposure time 1650 may be referred to as a long exposure, and the second exposure time to the fourth exposure time 1620 to 1640 may be exposure time values which are designated by exposure time longer than the short exposure and shorter than the long exposure, or may be values set by the user. As a result, the short exposure 1610 is applied to the first motion (not shown) such that the first motion is displayed in darkest natural color, for example, with the low intensity of an image. In addition, the long exposure 1650 is applied to the fifth motion (not shown) such that the fifth motion is displayed in brightest natural color, for example, with the high intensity of an image.

In addition, the photographing apparatus 100 may display the segmented motions on one sheet of image by overlaying one sheet of image in which the motions (not shown) are distinguished by brightness of natural color (white) with a time bar corresponding to the brightness based on the intensity of an image of each of the segmented motions. According to an example embodiment illustrated in FIG. 16A, the segmented motions may be displayed in order of becoming brighter. For example, the brightness of natural color corresponding to each of the pixel groups is applied to each of the segmented motions, so that the user can know the temporal sequence of the segmented motions (not shown) according to the order of the brightness displayed on the time bar. However, this is merely an example embodiment provided to explain the present disclosure, and the exposure time for each of the pixel groups may be implemented in various ways.

FIG. 16B is a timing chart to illustrate the segmented motions of the moving subject which become darker based on the temporal sequence. For example, becoming darker means that sharpness of images of the segmented motions of the subject decreases based on the temporal sequence. Referring to FIG. 16B, the first motion (not shown) may be distinguished by the first exposure section 1610, the second motion (not shown) may be distinguished by the second exposure section 1620, the third motion (not shown) may be distinguished by the third exposure section 1630, the fourth motion (not shown) may be distinguished by the fourth exposure section 1640, and the fifth motion (not shown) may be distinguished by the fifth exposure section 1650.

In addition, the segmented motions (first to fifth motions) (not shown) of the subject may be distinguished by a combination of the color filters applied in the exposure sections 1610 to 1650. In this example, the segmented motions (not shown) may be expressed in natural color (white) by combining the RGB pixel groups 1660, 1670, and 1680 at the same ratio.

In this example, the first exposure time 1610 has the longest length and the fifth exposure time 1650 has the shortest length. As illustrated in FIG. 16B, the length of the exposure time decreases from the first exposure section 1610 corresponding to the first motion (not shown) to the fifth exposure section 1650 corresponding to the fifth motion (not shown).

For example, the first exposure time 1610 may be referred to as a long exposure and the fifth exposure time 1650 may be referred to as a short exposure, and the second exposure time to the fourth exposure time 1620 to 1640 may be exposure time which is shorter than the long exposure and longer than the short exposure. The exposure time of each of the pixel groups may be a designated exposure time value or may be a value set by the user. As a result, the long exposure 1610 is applied to the first motion (not shown) such that the first motion is displayed in brightest natural color, for example, with the high intensity of an image. In addition, the short exposure 1650 is applied to the fifth motion (not shown) such that the fifth motion is displayed in darkest natural color, for example, with the low intensity of an image.

In addition, the photographing apparatus 100 may display the segmented motions on one sheet of image by overlaying one sheet of image in which the motions (not shown) are distinguished by intensity of natural color (white) with a time bar corresponding to the brightness based on the intensity of an image of each of the segmented motions. According to an example embodiment illustrated in FIG. 16B, the segmented motions may be displayed in order of becoming darker. For example, the brightness of natural color corresponding to each of the pixel groups is applied to each of the segmented motions, so that the user can know the temporal sequence of the segmented motions (not shown) based on the order of the brightness displayed on the time bar. However, this is merely an example embodiment provided to explain the present disclosure, and the exposure time for each of the pixel groups may be implemented in various ways.

In addition, in the present disclosure, the number of pixel groups based on the segmented motions of the fast movement is limited to 5 through FIGS. 15 to 16B. However, this is merely an example embodiment provided to explain the present disclosure, and the present disclosure is not limited to this. When photographing a motion of a subject which has fast or much movement, the photographing apparatus 100 may acquire as many segmented motions as the number of pixel groups acquired during an aperture opening time.

According to another example embodiment, when the user selects color pixel groups for segmented motions of a moving subject as rainbow color profiles, the first motion of the subject may be expressed in red and the last motion may be expressed in purple. In this example, the photographing apparatus 100 may express various colors by controlling a light collection ratio of the RGB color filter and thus controlling a duty ratio which is an exposure on/off frequency during exposure time.

According to another example embodiment, the user may select color of segmented motions of a moving subject as natural color (white), and may set the color to become brighter or darker. In this example, the photographing apparatus 100 may express different sharpness of each of the segmented motions by controlling the length of exposure time according to user's selection.

Examples of the pixel groups when the movement of a subject is slow or the number of motions is small will be understood through FIG. 14. For example, an image which is acquired when the movement of the subject is slow or the number of motions is small may have a small number of segmented motions.

In addition, according to an example embodiment, the photographing apparatus 100 may photograph a very fast motion of a subject which cannot be photographed in multiple frames. For example, in the case of multiple-frame photographing, time is required to photograph a next image after one image has been photographed. Therefore, in the multiple-frame photographing function of the photographing apparatus 100, it may be impossible to continuously photograph a motion which is made at a speed shorter than the time required between the images.

However, the photographing apparatus 100 according to an example embodiment may acquire segmented motions of a subject which moves vary fast and thus cannot be photographed in the multiple-frame photographing by controlling exposure on/off of each of the pixel groups of the sensor during a single aperture opening time. In addition, the photographing apparatus 100 can easily know the order of the motions of the subject moving fast through color and sharpness of an image which is differently applied based on the temporal sequence of the segmented motions in the acquired image.

According to another example embodiment, from images of segmented motions of a moving object which are acquired as a single image, images of segmented motions having similar color may be filtered. In this example, a moving image effect (for example, a GIF file format) may be generated by temporally rendering frames of the filtered still images.

FIGS. 17A-17C and 18 are diagrams illustrating an example user interface and are provided to explain a user command in a photographing apparatus.

Figure 17A:
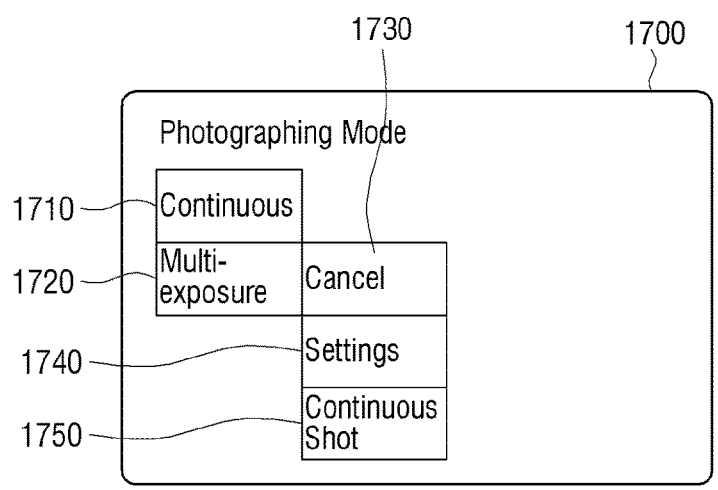
FIGS. 17A to 17C and 18 are diagrams illustrating a user interface and example user commands in a photographing apparatus.
Figure 17B:
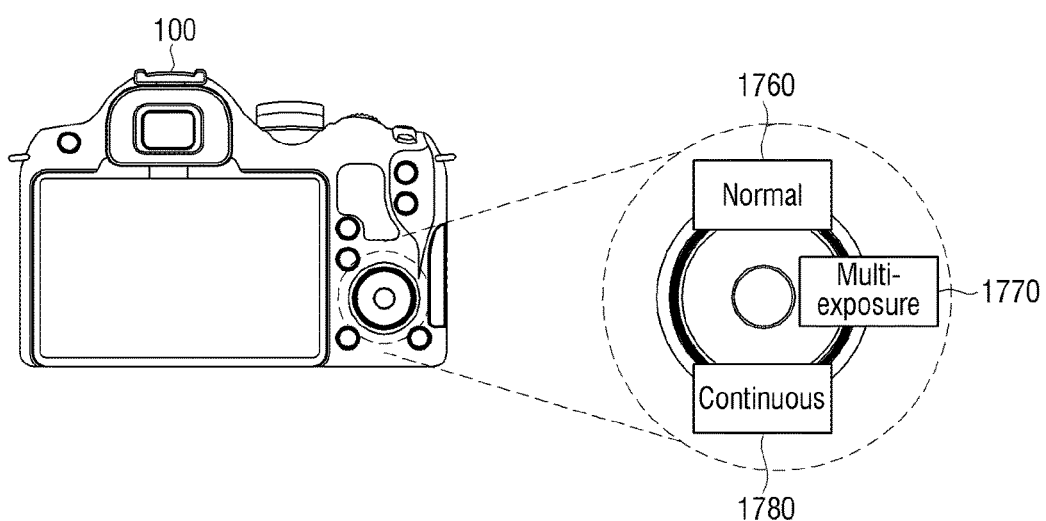
Figure 17C:
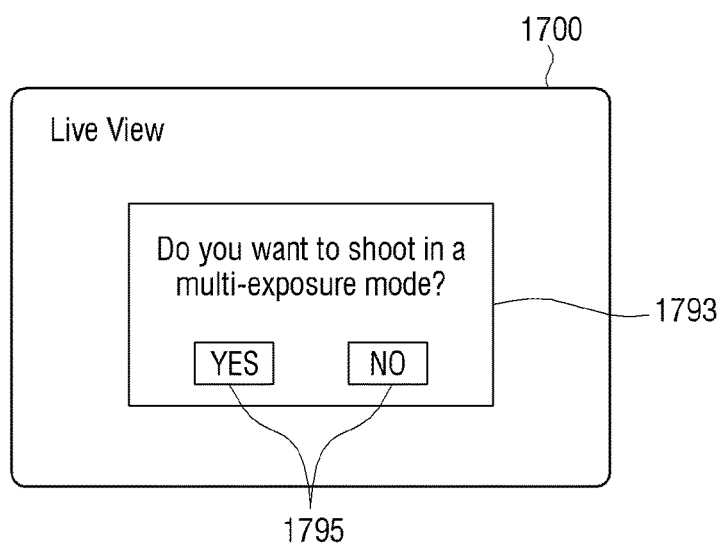

FIGS. 17A to 17C are diagrams illustrating examples of selecting, by the user, a multiple exposure photographing mode command in the photographing apparatus.

FIG. 17A is a diagram illustrating menus 1710 to 1750 for selecting a photographing mode, which are displayed, for example, on the display 1700 of the photographing apparatus 100. Referring to FIG. 17A, the user may select a menu in various methods such as touching the menu on the screen, using a stylus pen, a button, a cursor, a wheel, or moving a bar, or the like.

In response to the user selecting the multiple exposure photographing mode 1720, functions such as cancel 1730, user setting 1740, and continuous shot 1750 may be displayed on the menu. The cancel 1730 is a function of not using the multiple exposure photographing mode. The setting 1740 is a function of selecting, by the user, color for each of the pixel groups of the sensor. In this example, the color may be natural color (white) which is not different from background color or may be a specific color profile which is different from background color. In addition, the setting 1740 may be default setting for applying a designated default setting value in the photographing apparatus 100.

The continuous shot 1750 may, for example, be a function which is applied when the photographing apparatus 100 intends to photograph an image the movement of a subject of which can be estimated, or which has a fast motion or much motions. However, the function of the continuous shot 1750 may be set by the user, and may automatically recommend a motion by analyzing a motion of a live view with a designated function in the photographing apparatus 100. However, the above-described example embodiments are merely example embodiments provided to explain the present disclosure, and the present disclosure is not limited to these embodiments and may be implemented in various ways.

FIG. 17B illustrates an example menu for selecting a multiple exposure photographing mode, which is mounted on an exterior of the photographing apparatus 100. Referring to FIG. 17B, the photographing apparatus 100 may include, for example, a button or a bar for selecting photographing modes 1760 to 1780. In this example, the button or the bar according to an example embodiment may be disposed, for example, on a side surface of the photographing apparatus 100 or may be disposed, for example, on a front surface or a rear surface. In addition, the button or bar may be selected by clicking or may be controlled in the form of a wheel. However, the above-described examples are merely example embodiments provided to explain the present disclosure, and the present disclosure is not limited to these and may be implemented in various ways.

FIG. 17C illustrates an example function of recommending, by the photographing apparatus 100, a multiple exposure photographing mode by analyzing a movement speed and a trajectory of a subject in a live view. The photographing apparatus 100 may automatically recommend the multiple exposure photographing mode by analyzing a motion of a subject in a live view based on information on time and direction of a motion which can be estimated by analyzing speeds and trajectories of various motions. Referring to FIG. 17C, the display 1700 may analyze the movement of the subject in the live view screen and then recommend the multiple exposure mode photographing to the user through a pop-up menu 1793. In this example, the user may identify the pop-up menu 1793 while photographing and may select whether to proceed with the multiple exposure photographing (Y) 1795 or not (N) 1795. The photographing apparatus 100 may proceed with photographing based on a command according to user's selection.

Figure 18:
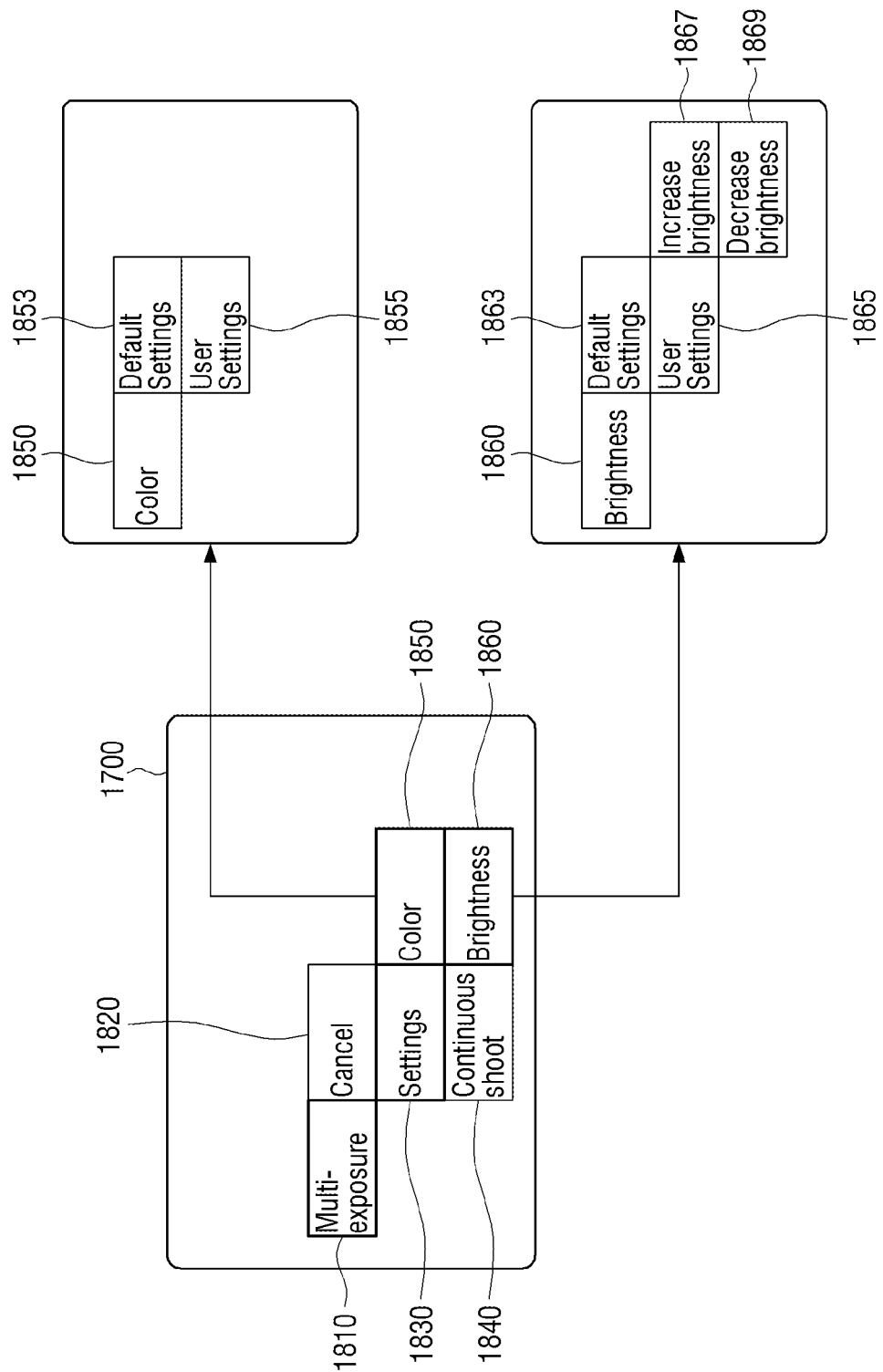

FIG. 18 is a diagram illustrating example contents to be set when a multiple exposure photographing mode 1810 is selected in the photographing apparatus 100 and setting 1830 is selected by the user. Referring to FIG. 18, setting of color 1850 may include default setting 1853 to apply a default value based on information stored in the photographing apparatus 100 and user setting 1855 for the user to directly select a color profile.

In this example, the user setting 1855 may display a list of color profiles (not shown) stored in the photographing apparatus 100. In addition, the user may generate a new color profile (not shown) by combining colors of the list of the color profiles (not shown). The user may select color to be applied to segmented motions from among the displayed list of color profiles. In addition, when the number of color profiles selected by the user is smaller than the number of images of segmented motions, the photographing apparatus 100 may express the image in color similar to the selected color.

In addition, when the user wishes to apply natural color (white) rather than a specific color profile to segmented motions and a specific event, the user may select brightness 1860. The brightness 1860 may include default setting 1863 to apply a default value based on information stored in the photographing apparatus 100, and user setting 1865 for the user to set brightness. In addition, the user setting 1865 may set segmented motions of a photographed moving object to become brighter 1867 or become darker 1869 based on the temporal sequence.

According to another example embodiment, the user may select the color profile or the brightness while photographing on a live view screen. In addition, the user may select color or brightness to be applied to segmented motions of each of the two different subjects on a live view screen prior to photographing or while photographing.

For example, when one scene of a baseball game is photographed, the scene may include a segmented motion B of a subject A which throws a ball, and a segmented motion D of a subject C which hits the ball with a bat on a live view screen. In this example, the user may select a setting menu through a button of the live view screen (not shown) or the electronic device 100 prior to photographing or while photographing, and may set to apply a user-designated color profile to the segmented motion B and apply user-designated brightness to the segmented motion D.

However, the example embodiments of FIGS. 17A-17C and 18 are merely example embodiments provided to explain the present disclosure, and the present disclosure is not limited to these embodiments. In addition, the photographing apparatus 100 may apply the present disclosure by implementing various user interfaces.

Figure 19:
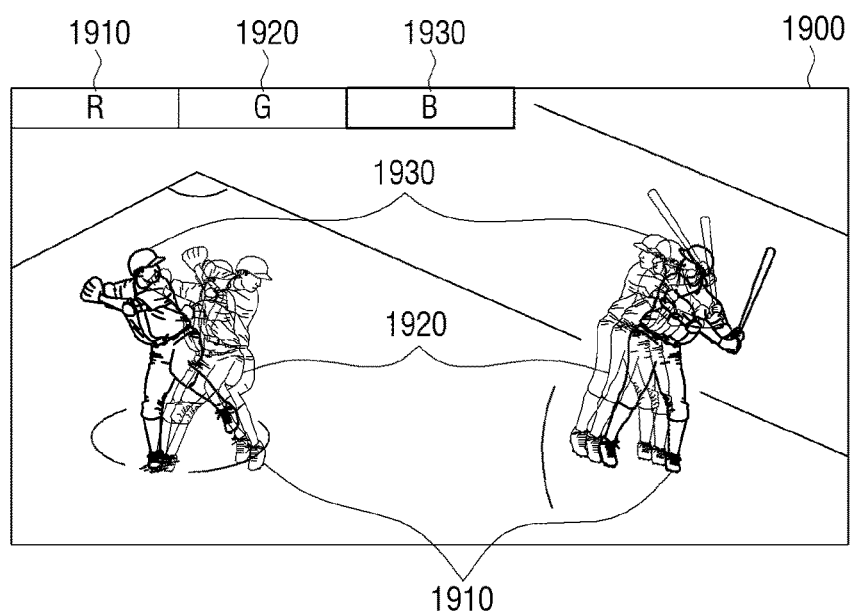
FIG. 19 is a diagram illustrating an example photographing apparatus which displays a temporal sequence of segmented motions according to an image and color to which exposure on/off is applied according to a color pixel group.

FIG. 19 is a diagram illustrating an example photographing apparatus which displays a temporal sequence of segmented motions based ion an image and color to which exposure on/off is applied based on a color pixel group according to an example embodiment. Referring to FIG. 19, the electronic device 100 may express segmented motions of a moving subject as a single image through a display 1900.

In this example, R 1910 in color pixel groups is applied to a first motion 1910, G 1920 in color pixel groups is applied to a second motion 1920, and B 1930 in color pixel groups is applied to a third motion 1930. In addition, the display 1900 may express colors of the pixel groups applied to the segmented motions on a time bar based on the temporal sequence of occurrence of the motions. Therefore, the user can easily know the temporal sequence of the segmented motions of the subject based on the order of color displayed on the time bar.

However, the above-described example is merely an example embodiment provided to explain the present disclosure, and the present disclosure is not limited to this. According to another example embodiment, an image having fast or much movement, for example, an image having 13 segmented motions, may be expressed on the display 1900 (not shown). As the number of segmented motions in an image acquired by the photographing apparatus 100 increases, the user may have difficulty in knowing the temporal sequence of the segmented motions. However, since the color profiles and brightness applied to the segmented motions are displayed on the display 1900 in the temporal sequence according to an example embodiment, the user can easily know the temporal sequence of the segmented motions even when the image has a large number of segmented motions. In addition, the time bar overlaid with color and brightness applied to the segmented motions may be displayed on a lower end or both side surfaces of the display 1900.

Figure 20:
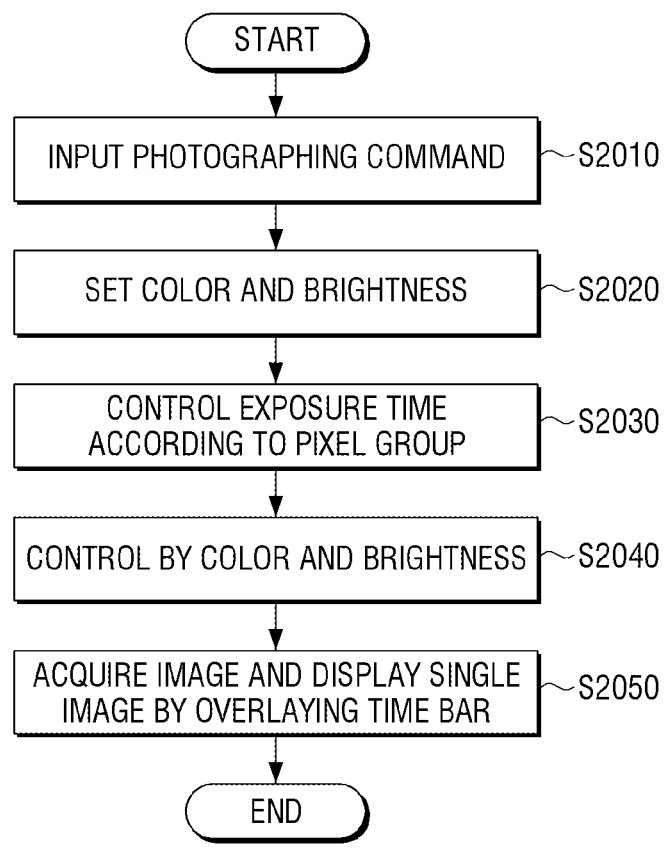
FIG. 20 is a flowchart illustrating an example of acquiring an image photographed through a multiple exposure sensor.

FIG. 20 is a flowchart illustrating an example of acquiring an image photographed through a multiple exposure sensor. Referring to FIG. 20, the photographing apparatus 100 receives an input of a photographing command, for example, from the user (S2010). In this example, the photographing command may include preparations to open an aperture in order for the photographing apparatus 100 to photograph. In addition, the photographing apparatus 100 may receive an input of a multiple exposure photographing mode command from the user. In response to the photographing apparatus 100 entering the photographing mode, the photographing apparatus 100 may set pixel groups to be applied to a moving subject based on color (S2020). In addition, the photographing apparatus 100 may acquire an image of natural color by controlling exposure time of the pixel groups, and control the brightness of the acquired natural color according to the temporal sequence of segmented motions. In this example, the setting by the user may be performed before photographing or while photographing. In addition, the photographing apparatus 100 may recommend a corresponding command to the user based on setting information stored in the photographing apparatus 100 before the user sets.

The photographing apparatus 100 may be configured to control the exposure time of the pixel groups which are distinguished by color filters of each area or each color to express the segmented motions of the moving subject according to color or brightness set as described above (S2030). In this example, the color or the sharpness of the brightness may be differently implemented based on the length of the exposure time. In addition, the color may be differently implemented by controlling a frequency of exposure on/off according to a mixing ratio of RGB pixels (S2040).

The photographing apparatus 100 may overlay one sheet of image which is acquired by the color or brightness applied to the distinguished pixel groups, with a time bar indicating the temporal sequence of the applied color or brightness, and may display one sheet of image on the display (S2050).

Accordingly, the photographing apparatus 100 according to an example embodiment may acquire segmented motions of a subject moving fast as one sheet of image. In addition, the photographing apparatus 100 can express the segmented motions of the acquired image based on color or brightness selected by the user. In addition, the photographing apparatus 100 may display the color or brightness applied to the segmented motions on a time bar according to the temporal sequence of occurrence of the segmented motions. Accordingly, the user can easily know the temporal sequence of the segmented motions of the moving subject in a single image.

The photographing method according to example embodiments of the present disclosure may be implemented in a recording medium which is readable by a computer or a similar device using software, hardware, or a combination of these.

The apparatus or method according to various example embodiments may be performed by at least one computer (for example, a processor) which executes instructions included in at least one program from among programs which are maintained in a computer-readable storage medium. When the instructions are executed by a computer (for example, a processor), the at least one computer may perform a function corresponding to the instructions. In this example, the computer-readable storage medium may be a memory, for example.

The program may be included in a computer-readable storage medium such as a hard disk, a floppy disk, magnetic medium (for example, a magnetic tape), optical media (for example, a compact-disc read only memory (CD-ROM), a digital versatile disk (DVD), a magneto-optical media (for example, a floptical disk)), a hardware device (for example, ROM, a random access memory (RAM), or a flash memory), etc. In this example, the storage medium may be included as a part of a configuration of the photographing apparatus, but may be mounted through a port of the photographing apparatus or may be included in an external device (for example, a cloud, a server, or another electronic device) located outside the photographing apparatus.

In addition, the program may be stored in a plurality of storage media separately. In this example, at least part of the plurality of storage media may be located in an external device of the photographing apparatus.

The instructions may include machine language codes created by a compiler, and high-level language codes that can be executed by a computer using an interpreter. The above-described hardware device may be configured to operate as one or more software modules to perform the operations according to various exemplary embodiments, and vice versa.

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A photographing apparatus for photographing an image through a multiple exposure sensor, the photographing apparatus comprising:
   an image sensor including a plurality of pixels comprising a plurality of colors;
   input circuitry configured to receive an input of a photographing command; and
   a processor configured to:
   control exposure times to be different for each of a plurality of pixel groups in which the plurality of pixels are grouped by color in response to a photographing command being input through the input circuitry,
   acquire, through the image sensor, a plurality of images in which segmented movements of an object are represented by different colors and/or brightnesses, respectively, based on the different exposure times for each of the plurality of pixel groups,
   wherein the processor is further configured to control the colors and/or brightnesses of the segmented movements based on a color profile selected before input of the photographing command, detect a background color on a live view before input of the photographing command, and automatically set the colors and/or brightnesses of the segmented movements based on the selected color profile and the detected background color.

2. The photographing apparatus of claim 1, wherein, while the image is being photographed, the processor is configured to control one or more of exposure on/off states of the plurality of pixel groups or an exposure on/off state having a duty ratio which is an exposure on/off frequency for controlling the exposure times of the plurality of pixel groups.

3. The photographing apparatus of claim 1, wherein the processor is configured to turn on at least one of the plurality of pixel groups in a first portion of a time during which the image is photographed to acquire a first segmented movement in a first color, and to turn on at least another one of the plurality of pixels in a second portion of the time during which the image is photographed to acquire a second segmented movement in a second color different from the first color.

4. The photographing apparatus of claim 1, wherein the processor is configured to turn on all of the plurality of pixel groups during a first time in a first portion of the time during which the image is photographed to acquire a first segmented movement having a first brightness value corresponding to the first time, and to turn on all of the plurality of pixel groups during a second time in a second portion of the time during which the image is photographed to acquire a second segmented movement having a second brightness value different from the first brightness value.

5. The photographing apparatus of claim 1, further comprising:
   a storage,
   wherein the processor is configured to determine, based on receiving a command to set color or brightness of a plurality of segmented movements included in an image, the exposure times of the plurality of pixel groups, and to store the determined exposure times in the storage.

6. The photographing apparatus of claim 1, wherein the processor is configured to:
   analyze a live view image;
   determine movement of an object included in the live view image based on a designated speed;
   estimate movement of the object based on the determined movement; and
   control the exposure times of the plurality of pixel groups based on the estimated movement.

7. The photographing apparatus of claim 6, wherein the processor is configured to, based on the object being determined to have a number of segmented movements greater than a first threshold or speed of movements faster than a second threshold, control the exposure times of the plurality of pixel groups to increase the number of segmented movements of the object included in the image.

8. The photographing apparatus of claim 1, wherein the processor is configured to control the exposure times of the plurality of pixel groups in which the plurality of pixels are grouped based on areas of pixels in which movements of different objects included in the image are present.

9. A method of a photographing apparatus, comprising:
   capturing an image through an image sensor including a plurality of pixels comprising a plurality of colors;
   receiving a photographing command input;
   in response to a photographing command being input, controlling exposure times to be different for each of a plurality of pixel groups in which the plurality of pixels are grouped by color; and
   acquiring, through the image sensor, a plurality of images in which segmented movements of an object are represented by different colors and/or brightnesses, respectively, based on the different exposure times for each of the plurality of pixel groups,
   wherein the method further comprises selecting a color profile before input of the photographing command on which the colors and/or brightnesses of the segmented movements are based, detecting a background color on a live view before input of the photographing command, and automatically setting the colors and/or brightnesses of the segmented movements based on the selected color profile and the detected background color.

10. The method of claim 9, wherein the controlling comprises, while the image is being photographed, controlling one or more of exposure on/off states of the plurality of pixel groups or an exposure on/off state having a duty ratio which is an exposure on/off frequency for controlling the exposure times of the plurality of pixel groups.

11. The method of claim 9, wherein the acquiring comprises turning on at least one of the plurality of pixel groups in a first portion of a time during which the image is photographed to acquire a first segmented movement in a first color, and turning on at least another one of the plurality of pixels in a second portion of the time during which the image is photographed to acquire a second segmented movement in a second color different from the first color.

12. The method of claim 9, further comprising:
based on receiving a command to set color or brightness of a plurality of segmented movements included in an image, determining the exposure times of the plurality of pixel groups, and storing the determined exposure times.

13. The method of claim 9, further comprising turning on all of the plurality of pixel groups during the first time in a first portion of the time during which the image is photographed to acquire a first segmented movement having a first brightness value corresponding to the first time, and turning on all of the plurality of pixel groups during a second time in a second portion of the time during which the image is photographed to acquire a second segmented movement having a second brightness value different from the first brightness value.

14. The method of claim 9, further comprising:
analyzing a live view image;
determining movement of an object included in the live view image based on a designated speed;
estimating movement of the object based on the determined movement; and
controlling the exposure times of the plurality of pixel groups based on the estimated movement.

15. The method of claim 14, further comprising:
based on the object being determined to have a number of segmented movements greater than a first threshold or a speed of movement greater than a second threshold, controlling the exposure times of the plurality of pixel groups to increase the number of segmented movements of the object included in the image.

16. The method of claim 9, wherein the controlling comprises controlling the exposure times of the plurality of pixel groups in which the plurality of pixels are grouped based on areas of pixels in which movements of different objects included in the image are present.

* * * * *